(12) United States Patent
Kutsuna et al.

(10) Patent No.: US 6,684,110 B1
(45) Date of Patent: Jan. 27, 2004

(54) CONTROL SYSTEM, APPARATUS, AND METHOD IN WHICH DISPLAY CHARACTERISTICS OF AN OPERATION PANEL ARE CHANGEABLE

(75) Inventors: Masaki Kutsuna, Yokohama (JP); Yoshikazu Shibamiya, Yokohama (JP); Katsuhiro Miyamoto, Isehara (JP); Takashi Yamamoto, Yamato (JP); Yuichi Matsumoto, Kawasaki (JP); Shuntaro Aratani, Machida (JP); Tetsu Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 09/605,373

(22) Filed: Jun. 29, 2000

(30) Foreign Application Priority Data

Jul. 2, 1999 (JP) .......................................... 11-189724

(51) Int. Cl.[7] ............................................. G05B 11/01
(52) U.S. Cl. ............................. 700/17; 700/19; 700/83; 345/716; 345/734
(58) Field of Search .............................. 700/17–19, 83, 700/84; 345/705, 716, 717, 719, 722, 727, 734, 764, 773; 340/635, 815.47, 815.6

(56) References Cited

U.S. PATENT DOCUMENTS

| | | | | | |
|---|---|---|---|---|---|
| 5,086,385 | A | * | 2/1992 | Launey et al. ............... | 364/188 |
| 6,112,127 | A | * | 8/2000 | Bennett ........................ | 700/86 |
| 6,192,282 | B1 | * | 2/2001 | Smith et al. ................... | 700/19 |
| 6,434,447 | B1 | * | 8/2002 | Shteyn ........................ | 700/245 |
| 6,449,514 | B1 | * | 9/2002 | Natsubori et al. ............. | 700/19 |
| 6,456,892 | B1 | * | 9/2002 | Dara-Abrams et al. ........ | 700/83 |
| 6,510,352 | B1 | * | 1/2003 | Badavas et al. .............. | 700/19 |

* cited by examiner

*Primary Examiner*—Paul P. Gordon
(74) *Attorney, Agent, or Firm*—Fitzpatrick, Cella, Harper & Scinto

(57) ABSTRACT

In a control system with a controlled apparatus and a control apparatus, the controlled apparatus includes an operation panel having display levels, and the control apparatus is adapted to receive the operation panel from the controlled apparatus, display the operation panel on a display device, and control the displayed operation panel using a control signal from an operating device. The control apparatus is adapted to inform the controlled apparatus of an operation to the operation panel, and to change a display mode of the operation panel, if a display level of the operation panel is changed.

27 Claims, 38 Drawing Sheets

FIG. 7

| | DATA STRUCTURE | ELEMENTS | | | | |
|---|---|---|---|---|---|---|
| | | PANEL | BUTTON | TEXT | ICON | RANGE |
| NECESSARY DATA | ELEMENT ID | ○ | ○ | ○ | ○ | ○ |
| | LABEL | ○ | ○ | ○ | ○ | ○ |
| | POSITION | ○ | ○ | ○ | ○ | ○ |
| | SIZE | ○ | | | | |
| | ELEMENT ID QUEUE | | | ○ | | |
| | TEXT LINK | | | | ○ | |
| | ICON BITMAP LINK | | | | | ○ |
| | MAXIMUM VALUE | | | | | ○ |
| | MINIMUM VALUE | | | | | |
| | INDICATION VALUE | | | | | |
| | ... | ... | ... | ... | ... | ... |
| SELECTED DATA | BACKGROUND COLOR | ○ | | ○ | | ○ |
| | BACKGROUND BITMAP LINK | ○ | | | ○ | ○ |
| | FONT | | | ○ | | |
| | DEPRESSION BITMAP LINK | | ○ | | | |
| | RELEASE BITMAP LINK | | ○ | | | |
| | AUDIO VISUAL | ○ | | | | |
| | ... | ... | ... | ... | ... | ... |

FIG. 8

| | | ELEMENTS | | | | |
|---|---|---|---|---|---|---|
| USER ACTION | ACTION CODE | PANEL | BUTTON | TEXT | ICON | RANGE |
| SELECT | 00h | ○ | | | ○ | |
| DEPRESS | 01h | | ○ | | | |
| RELEASE | 02h | | ○ | | | |
| ... | ... | ... | ... | ... | ... | ... |

FIG. 9A

| ELEMENT DATA STRUCTURE | |
|---|---|
| ADDRESS OFFSET | CONTENT |
| 00h | ELEMENT TYPE |
| 01h | |
| 02h | ELEMENT ID |
| 03h | |
| 04h | DATA LENGTH |
| 05h | |
| 06h | |
| 07h | |
| 08h<br>⋮<br>⋮ | ELEMENT DATA |

FIG. 9B

| REAL DATA DATA STRUCTURE | |
|---|---|
| ADDRESS OFFSET | CONTENT |
| 00h | ELEMENT TYPE |
| 01h | |
| 02h | ELEMENT ID |
| 03h | |
| 04h | DATA LENGTH |
| 05h | |
| 06h | |
| 07h | |
| 08h<br>⋮<br>⋮ | REAL DATA |

FIG. 10A

| TEXT LINK DATA STRUCTURE ||
|---|---|
| ADDRESS OFFSET | CONTENT |
| 00h | DATA TYPE |
| 01h | |
| 02h | ELEMENT ID |
| 03h | |

FIG. 10B

| BIT MAP LINK DATA STRUCTURE ||
|---|---|
| ADDRESS OFFSET | CONTENT |
| 00h | DATA TYPE |
| 01h | |
| 02h | ELEMENT ID |
| 03h | |

FIG. 10C

| ELEMENT LINK DATA STRUCTURE ||
|---|---|
| ADDRESS OFFSET | CONTENT |
| 00h | ELEMENT TYPE |
| 01h | |
| 02h | ELEMENT ID |
| 03h | |

FIG. 11A

| POSITION COORDINATE DATA STRUCTURE (PANEL ELEMENT) ||
|---|---|
| ADDRESS OFFSET | CONTENT |
| 00h | X COORDINATE |
| 01h | |
| 02h | Y COORDINATE |
| 03h | |

FIG. 11B

| POSITION COORDINATE DATA STRUCTURE (EXCEPT FOR PANEL ELEMENT) |||
|---|---|---|
| ADDRESS OFFSET | CONTENT ||
| 00h | HIGH LEVEL POSITION | X COORDINATE 0 |
| 01h | | |
| 02h | | Y COORDINATE 0 |
| 03h | | |
| 04h | MIDDLE LEVEL POSITION | X COORDINATE 1 |
| 05h | | |
| 06h | | Y COORDINATE 1 |
| 07h | | |
| 08h | LOW LEVEL POSITION | X COORDINATE 2 |
| 09h | | |
| 0Ah | | Y COORDINATE 2 |
| 0Bh | | |

FIG. 12A

| SIZE DATA STRUCTURE (PANEL ELEMENT) | | |
|---|---|---|
| ADDRESS OFFSET | CONTENT | |
| 00h | HIGH LEVEL SIZE | WIDTH 0 |
| 01h | | |
| 02h | | HEIGHT 0 |
| 03h | | |
| 04h | MIDDLE LEVEL SIZE | WIDTH 1 |
| 05h | | |
| 06h | | HEIGHT 1 |
| 07h | | |
| 08h | LOW LEVEL SIZE | WIDTH 2 |
| 09h | | |
| 0Ah | | HEIGHT 2 |
| 0Bh | | |

FIG. 12B

| SIZE DATA STRUCTURE (EXCEPT FOR PANEL ELEMENT) | |
|---|---|
| ADDRESS OFFSET | CONTENT |
| 00h | WIDTH |
| 01h | |
| 02h | HEIGHT |
| 03h | |

FIG. 13A

| COLOR DATA STRUCTURE ||
|---|---|
| ADDRESS OFFSET | CONTENT |
| 00h | 00h |
| 01h | COLOR DATA |
| 02h | |
| 03h | |

FIG. 13B

| FONT DATA STRUCTURE ||
|---|---|
| ADDRESS OFFSET | CONTENT |
| 00h | FONT CODE |
| 01h | |

FIG. 13C

| SELECTED DATA STRUCTURE ||
|---|---|
| ADDRESS OFFSET | CONTENT |
| 00h | SELECTED DATA TYPE |
| 01h | |
| ⋮ | SELECTED DATA |
| ⋮ | |

FIG. 13D

| AUDIO VISUAL DATA STRUCTURE ||
|---|---|
| ADDRESS OFFSET | CONTENT |
| 00h | CHANNEL (00B+6bit) |

FIG. 14A

| ELEMENTS | ELEMENT TYPE |
|---|---|
| PANEL | 8000h |
| BUTTON | 8004h |
| TEXT | 800Ah |
| ICON | 800Ch |
| RANGE | 8006h |

FIG. 14B

| REAL DATA | DATA TYPE |
|---|---|
| TEXT | 9000h |
| BIT MAP | 9100h |

FIG. 14C

| SELECTED DATA | SELECTED DATA TYPE |
|---|---|
| BACKGROUND COLOR | 81h |
| BACKGROUND BITMAP LINK | 83h |
| FONT SIZE | 0Ah |
| DEPRESSION BITMAP LINK | 87h |
| RELEASE BITMAP LINK | 88h |
| AUDIO VIDEO | 04h |

FIG. 14D

| FONT DESIGNATION | FONT CODE |
|---|---|
| SMALL (12×24 PIXELS) | 00h |
| MIDDLE (16×32 PIXELS) | 01h |
| LARGE (20×40 PIXELS) | 02h |

FIG. 16

| PANEL DATA STRUCTURE | | | |
|---|---|---|---|
| ADDRESS OFFSET | VALUE | CONTENT | |
| 00h | 80h | ELEMENT TYPE | |
| 01h | 00h | | |
| 02h | 00h | ELEMENT ID | |
| 03h | 00h | | |
| 04h | 00h | DATA LENGTH | |
| 05h | 00h | | |
| 06h | 00h | | |
| 07h | 3Fh | | |
| 08h | 80h | LABEL LINK | DATA TYPE |
| 09h | 0Ah | | |
| 0Ah | 00h | | ELEMENT ID |
| 0Bh | 0Dh | | |
| 0Ch | 00h | POSITION | X COORDINATE |
| 0Dh | 04h | | |
| 0Eh | 00h | | Y COORDINATE |
| 0Fh | 04h | | |
| 10h | 01h | HIGH LEVEL SIZE | WIDTH 0 |
| 11h | 68h | | |
| 12h | 00h | | HEIGHT 0 |
| 13h | 78h | | |
| 14h | 01h | MIDDLE LEVEL SIZE | WIDTH 1 |
| 15h | 68h | | |
| 16h | 00h | | HEIGHT 1 |
| 17h | 68h | | |
| 18h | 01h | LOW LEVEL SIZE | WIDTH 2 |
| 19h | 68h | | |
| 1Ah | 00h | | HEIGHT 2 |
| 1Bh | 58h | | |
| 1Ch | 80h | BUTTON LINK (0) | ELEMENT TYPE |
| 1Dh | 04h | | |
| 1Eh | 00h | | ELEMENT ID |
| 1Fh | 01h | | |
| ⋮ | ⋮ | ⋮ | ⋮ |
| 4Bh | 80h | BUTTON LINK (11) | ELEMENT TYPE |
| 4Ch | 04h | | |
| 4Dh | 00h | | ELEMENT ID |
| 4Eh | 0Ch | | |

FIG. 17

| BUTTON DATA STRUCTURE ||||
|---|---|---|---|
| ADDRESS OFFSET | VALUE | CONTENT ||
| 00h | 80h | ELEMENT TYPE ||
| 01h | 04h | ||
| 02h | 00h | ELEMENT ID ||
| 03h | 01h | ||
| 04h | 00h | DATA LENGTH ||
| 05h | 00h | ||
| 06h | 00h | ||
| 07h | 3Fh | ||
| 08h | 90h | LABEL LINK | DATA TYPE |
| 09h | 00h | | |
| 0Ah | 00h | | ELEMENT ID |
| 0Bh | 0Eh | | |
| 0Ch | 01h | HIGH LEVEL POSITION | X COORDINATE 0 |
| 0Dh | 00h | | |
| 0Eh | 01h | | Y COORDINATE 0 |
| 0Fh | 00h | | |
| 10h | 00h | MIDDLE LEVEL POSITION | X COORDINATE 1 |
| 1Ah | 70h | | |
| 1Bh | 00h | | Y COORDINATE 1 |
| 1Ch | 70h | | |
| 1Dh | 00h | LOW LEVEL POSITION | X COORDINATE 2 |
| 1Eh | 10h | | |
| 1Fh | 00h | | Y COORDINATE 2 |
| 20h | 10h | | |
| 21h | 00h | SIZE | WIDTH |
| 22h | 20h | | |
| 23h | 00h | | HEIGHT |
| 24h | 20h | | |
| 25h | 87h | SELECTED DATA | SELECTED DATA TYPE |
| 26h | 91h | DEPRESSION BITMAP LINK | ELEMENT TYPE |
| 27h | 00h | | |
| 28h | 00h | | ELEMENT ID |
| 29h | 0Fh | | |
| 2Ah | 88h | SELECTED DATA | SELECTED DATA TYPE |
| 2Bh | 91h | RELEASE BITMAP LINK | ELEMENT TYPE |
| 2Ch | 00h | | |
| 2Dh | 00h | | ELEMENT ID |
| 2Eh | 10h | | |

FIG. 18

| | BUTTON TYPE |||||
|---|---|---|---|---|---|
| | POWER SOURCE | CHANNEL | VOLUME | SOUND FIELD SETTING | COLOR ADJUSTMENT |
| HIGH LEVEL DISPLAY | O | O | O | O | O |
| MIDDLE LEVEL DISPLAY | O | O | O | | |
| LOW LEVEL DISPLAY | O | O | | | |

1394 LAYER STRUCTURE

FCP REGISTER ALLOCATION

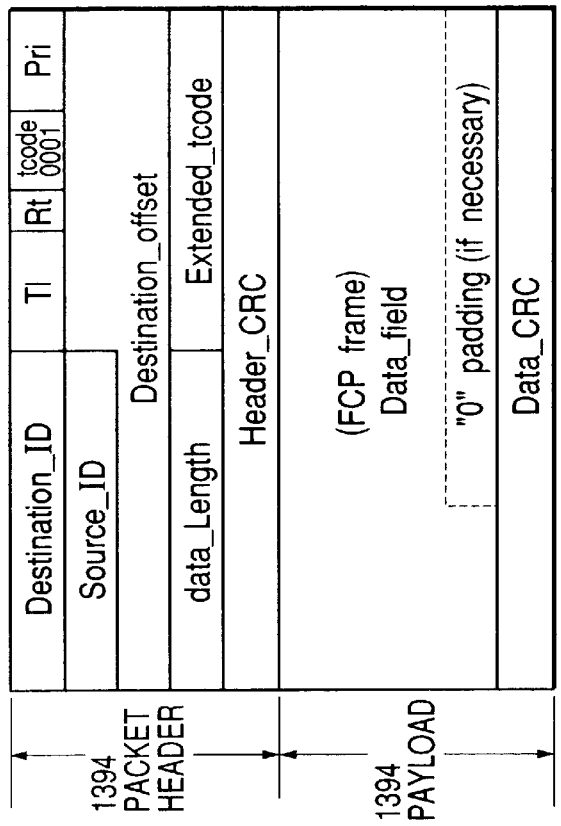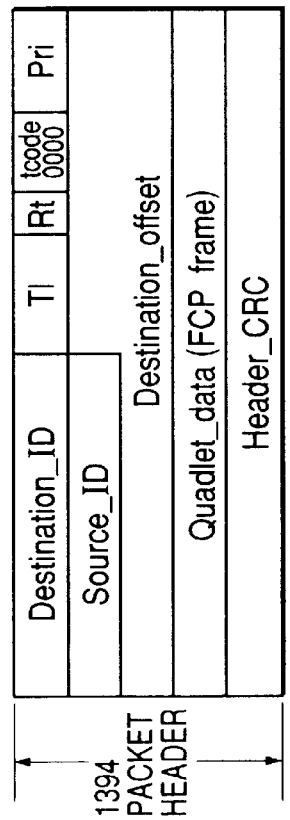
FIG. 29A quadlet_write
FIG. 29B block_write
1394 ASYNCHRONOUS WRITE PACKET FOR FCP COMMAND FRAME

FIG. 30

AV/C COMMAND FRAME STRUCTURE

| cts | ctype | subunit_type | subunit_ID | opcode | operand (0) |
|---|---|---|---|---|---|
| operand (1) | | operand (2) | | operand (3) | operand (4) |
| ----------- | | | | | |
| operand (n) | | "0" padding (if necessary) | | | |

UNIT SPEC = subunit_type + subunit_ID

FIG. 31

AV/C RESPONSE FRAME STRUCTURE

| cts | response | subunit type | subunit ID | opcode | operand (0) |
|---|---|---|---|---|---|
| operand (1) | | operand (2) | | operand (3) | operand (4) |
| ----------- | | | | | |
| operand (n) | | "0" padding (if necessary) | | | |

FIG. 32
UNIT COMMANDS

| OPCODE | VALUE | MEANS |
|---|---|---|
| CHANNEL USAGE | 12h | CHECK UNIT WHICH IS USING IEEE 1394 ISOCHRONOUS |
| CONNECT | 24h | ESTABLISH CONNECTION BY UNSPECIFIED STREAM BETWEEN ISOCHRONOUS PLUG AND SUBUNIT |
| CONNECT AV | 20h | CONNECT AUDIO/VIDEO BETWEEN ISOCHRONOUS PLUG AND SUBUNIT |
| CONNECTIONS | 22h | REQUEST REPORT OF CONNECTION STATUS |
| DIGITAL INPUT | 11h | SET BROADCAST INPUT/OUTPUT PLUG |
| DIGITAL OUTPUT | 10h | |
| DISCONNECT | 25h | DISCONNECT CONNECTION BY UNSPECIFIED STREAM BETEEN ISOCHRONOUS PLUG AND SUBUNIT |
| DISCONNECT AV | 21h | DISCONNECT AUDIO/VIDEO BETWEEN ISOCHRONOUS PLUG AND SUBUNIT |
| INPUT PLUG SIGNAL FORMAT | 19h | SET AND CHECK SIGNAL FORMAT OF INPUT/OUTPUT ISOCHRONOUS PLUG |
| OUTPUT PLUG SIGNAL FORMAT | 18h | |
| ASYNCHRONOUS CONNECTION | 26h | DETERMINE DETAIL BY SUBFUNCTION ABOUT ASYNCHRONOUS CONNECTION |
| SUBUNIT INFO | 31h | REPORT SUBUNIT INFORMATION |
| UNIT INFO | 30h | REPORT UNIT INFORMATION |

FIG. 33

PLUG CONTROL REGISTER

| Address | Register |
|---|---|
| FFFFF0000900h | oMPR (OUTPUT MASTER PLUG REGISTER) |
| FFFFF0000904h | oPCR (OUTPUT PLUG CONTROL REGISTER)[0] |
| FFFFF0000908h | oPCR [1] |
| FFFFF000090Ch | oPCR [2] |
| FFFFF000097Ch | oPCR [30] |
| FFFFF0000980h | iMPR (INPUT MASTER PLUG REGISTER) |
| FFFFF0000984h | iPCR (INPUT PLUG CONTROL REGISTER)[0] |
| FFFFF0000988h | iPCR [1] |
| FFFFF000098Ch | iPCR [2] |
| FFFFF00009FCh | iPCR [30] |

FIG. 34

OUTPUT MASTER PLUG REGISTER

| Data rate capability | Broadcast channel base | Non-persistent extension field | Persistent extension field | reserved | Number of output plugs |
|---|---|---|---|---|---|

FIG. 35

OUTPUT PLUG CONTROL REGISTER

| on-line | broadcast connection counter | point-to-point connection counter | reserved | channel number | Data rate | Overhead ID | payload |
|---|---|---|---|---|---|---|---|

FIG. 36
INPUT MASTER PLUG REGISTER

| Data rate capability | reserved | Non-persistent extension field | Persistent extension field | reserved | Number of input plugs |

FIG. 37
INPUT PLUG CONTROL REGISTER

| on-line | broadcast connection counter | point-to-point connection counter | reserved | channel number | reserved |

OVERLAY BROADCAST-OUT CONNECTION SEQUENCE

BROADCAST-IN CONNECTION SEQUENCE

OVERLAY BROADCAST-IN CONNECTION SEQUENCE

1394 ISOCHRONOUS PACKET FOR CIP

FIG. 45

AV/C COMMAND FRAME STRUCTURE
FOR ASYNCHRONOUS SUBFUNCTION

| cts | ctype | subunit_type | subunit ID | opcode | subfunction | | |
|---|---|---|---|---|---|---|---|
| status | | plug ID | | plug offset Hi | | | |
| plug offset Lo | | | | | | pPort ID | pBits |
| connect node ID | | | | connect offset Hil | | | |
| connect offset Lol | | | | | | cPort ID | cBits |
| connect plug ID | | overlay Count | | reserved | | | |

FIG. 46

AV/C RESPONSE FRAME STRUCTURE
FOR ASYNCHRONOUS SUBFUNCTION

| cts | response | subunit_type | subunit ID | opcode | subfunction | | |
|---|---|---|---|---|---|---|---|
| status | | plug ID | | plug offset Hi | | | |
| plug offset Lo | | | | | | pPort ID | pBits |
| connect node ID | | | | connect offset Hil | | | |
| connect offset Lol | | | | | | cPort ID | cBits |
| connect plug ID | | overlay Count | | reserved | | | |

FIG. 47

AV/C COMMAND FOR ASYNCHRONOUS CONNECTION MANAGEMENT

| VALUE | COMMAND | TARGET | DESCRIPTION |
|---|---|---|---|
| 01h | ALLOCATE | CONSUMER | OBTAIN ASYNCHRONOUS PLUG RESOURCE OF CONSUMER |
| 02h | ATTACH | CONSUMER | CONNECT CONSUMER ASYNCHRONOUS PLUG WITH PRODUCER ASYNCHRONOUS PLUG |
| 03h | ALLOCATE_ATTACH | PRODUCER | OBTAIN ASYNCHRONOUS PLUG RESOURCE OF PRODUCER, AND CONNECT WITH CONSUMER ASYNCHRONOUS PLUG |
| 04h | — | — | |
| 05h | RELEASE | CONSUMER | RELEASE CONSUMER ASYNCHRONOUS PLUG RESOURCE |
| 06h | DETACH | CONSUMER | DISCONNECT CONSUMER ASYNCHRONOUS PLUG AND PRODUCER ASYNCHRONOUS PLUG |
| 07h | DETACH_RELEASE | PRODUCER | DISCONNECT CONSUMER ASYNCHRONOUS PLUG, AND RELEASE PRODUCER ASYNCHRONOUS PLUG RESOURCE |
| 0Ah | ADD_OVERLAY | CONSUMER | OVERLAY-CONNECT CONSUMER ASYNCHRONOUS PLUG WITH PRODUCER ASYNCHRONOUS PLUG |
| 10h | SUSPEND_PORT | CONSUMER | SET CONSUMER PORT IN SUSPEND STATE |
| 20h | RESUME_PORT | | |
| 40h | RESTORE_PORT | | |
| 82h | ATTACH_FRAME | | |
| 83h | ALLOCATE_ATTACH_FRAME | | |
| C0h | RESTORE_PORT_FRAME | | |
| OTHER VALUES | — | — | RESERVED |

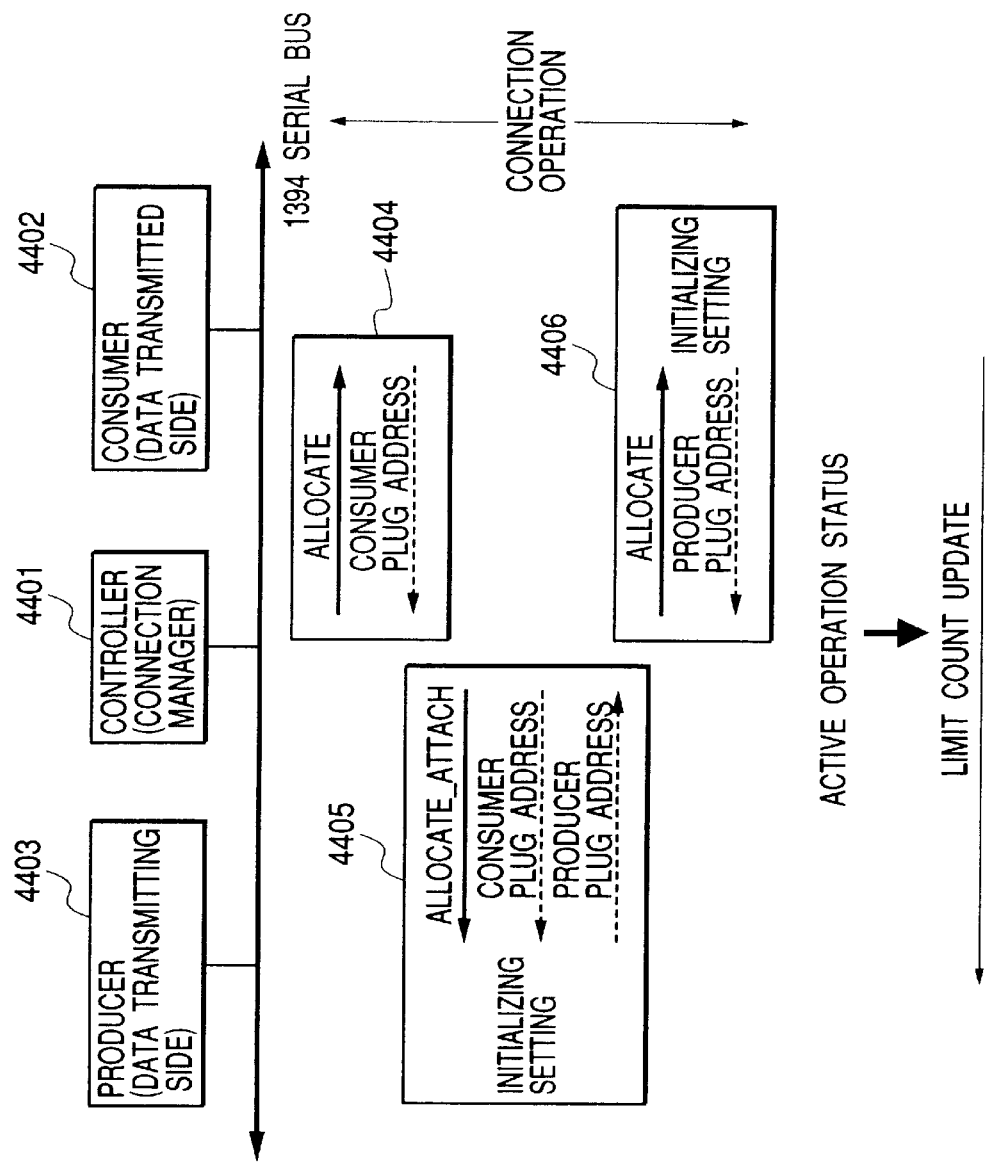

AV/C ASYNCHRONOUS DATA FRAME STRUCTURE

CONTROL SYSTEM, APPARATUS, AND METHOD IN WHICH DISPLAY CHARACTERISTICS OF AN OPERATION PANEL ARE CHANGEABLE

BACKGROUND OF THE INVENTION

1. Field of the Invention

The present invention relates to a technique for remotely controlling pieces of electronic equipment on a network.

2. Related Background Art

Digital communication technology for high-speed transmission of data requiring real-time processing, such as dynamic image information and audio information, and data requiring reliability of communication, such as image information and control information, has recently been developed.

Using such technology, a technique for connecting audio and video equipment, a personal computer and its peripheral devices, all existing in the home, to construct a digital communication network (a so-called home network) has also been developed.

A television receiver is considered to assume a dominant position in constructing a home network and provide a user with several kinds of graphical user interfaces (hereinbelow, called GUIs).

For example, the television receiver is used as a control apparatus that provides the user with a GUI for remotely controlling a desired piece of electronic equipment (controlled apparatus). The user operates a remote control unit (remote control) or the like for the television receiver according to the GUI to remotely control the desired electronic equipment.

However, when such a home network is constructed, the problem of how to provide the GUI in the television receiver as a control apparatus for remotely controlling controlled apparatuses arises.

In general, a control program for displaying the GUI, and a control program for remotely controlling a controlled apparatus according to the operation to the GUI vary from one controlled apparatus to another. Therefore, every time a new type of equipment or equipment that is of a conventional type but has a novel function is connected to the network, the user must prepare the television receiver a control program for the newly connected equipment, and this program preparation is very burdensome. To solve this problem, several types of control programs for likely-to-be-connected equipment may be stored in the television receiver beforehand, but this method is impractical because it cannot deal with equipment having a novel function.

On the other hand, in a method of operating the GUI with the remote control, a cursor displayed on the GUI may be moved up, down and sideways using any operation key on the remote control to select a desired function.

Such a GUI operating method, however, requires the user to press a certain operation key plural times to select the desired function, and it takes time to execute the desired function.

Further, as operable functions increase, the size of the GUI needs to be enlarged, and as a result, the operation screen of the GUI may occupy most of the display area on the display screen. In this case, the operation screen interferes with images to be displayed in the display area outside the operation screen, resulting in ineffective utilization of the display screen.

SUMMARY OF THE INVENTION

An object of the present invention is to solve the above-mentioned problems.

Another object of the present invention is to provide a technique for remotely controlling pieces of electronic equipment on a network in a simple and easy way.

In a preferred form of the present invention, the above objects are attained by the provision of a control system, comprising:

(a) controlled apparatus from which plural display levels of operation panels are transmitted; and (b) a control apparatus that supplies one of the operation panels to a display device, operates the operation panel displayed on the display device based on a control signal from an operating device, and informs the controlled apparatus of the operation on the operation panel, wherein the control apparatus changes a display mode of the operation panel according to the plural display levels.

In another form of the present invention, there is provided an electronic equipment, comprising:

(a) a reception unit for receiving an operation panel provided in a controlled apparatus, the operation panel having plural display levels;

(b) a control unit for supplying the operation panel to a display device and operating the operation panel displayed on the display device based on a control signal from an operating device; and (c) a transmission unit for informing the controlled apparatus of the operation to the operation panel, wherein the control unit changes the display mode of the operation panel according to the plural display levels.

In still another form of the present invention, there is provided a method of controlling electronic equipment, comprising the steps of:

(a) receiving an operation panel provided in a controlled apparatus, the operation panel having plural display levels;

(b) supplying the operation panel to a display device and operating the operation panel displayed on the display device based on a control signal from an operating device; and (c) informing the controlled apparatus of the operation to the operation panel, wherein the display mode of the operation panel is changed according to the plural display levels.

Still other objects of the present invention, and the advantages thereof, will become fully apparent from the following detailed description of the embodiments.

BRIEF DESCRIPTION OF THE DRAWINGS

FIG. 7 is a table for explaining elements on an operation panel according to the embodiment of the present invention;

FIG. 8 is a table showing an example of user action;

FIGS. 9A and 9B are tables showing structures of element data and real data;

FIGS. 10A, 10B and 10C are tables respectively showing structures of text link data, bitmap link data, and element link data;

FIGS. 11A and 11B are tables showing structures of position coordinate data;

FIGS. 12A and 12B are tables showing structures of size data;

FIGS. 13A, 13B, 13C and 13D are tables respectively showing structures of color data, font data, selected data, and audio-visual data;

FIGS. 14A, 14B, 14C and 14D are tables respectively showing types of element data, real data, selected data and font data;

FIG. 16 is a table showing an example of structure of panel element data;

FIG. 17 is a table showing an example of structure of button element data;

FIG. 18 is a table showing a relationship between each button element and display levels;

FIGS. 29A and 29B are illustrations for explaining FCP frame formats;

FIG. 30 is an illustration for explaining an AV/C command frame format;

FIG. 31 is an illustration for explaining an AV/C response frame format;

FIG. 32 is a table for explaining unit commands in an AV/C command;

FIG. 33 is an illustration for explaining a plug control register in an AV/C isochronous connection protocol;

FIG. 34 is an illustration for explaining an output master plug register in the AV/C isochronous connection protocol;

FIG. 35 is an illustration for explaining an output plug control register in the AV/C isochronous connection protocol;

FIG. 36 is an illustration for explaining an input master plug register in the AV/C isochronous connection protocol;

FIG. 37 is an illustration for explaining an input plug control register in the AV/C isochronous connection protocol;

FIG. 45 is an illustration for explaining a command frame in an AV/C asynchronous connection protocol;

FIG. 46 is an illustration for explaining a response frame in the AV/C asynchronous connection protocol;

FIG. 47 is an illustration for explaining contents of commands in the AV/C asynchronous connection protocol;

FIG. 48 is a block diagram for explaining a connection procedure in the AV/C asynchronous connection protocol;

DESCRIPTION OF THE PREFERRED EMBODIMENTS

The preferred embodiments of the present invention will now be described in detail hereinafter with reference to the accompanying drawings.

First Embodiment

Figure 1:
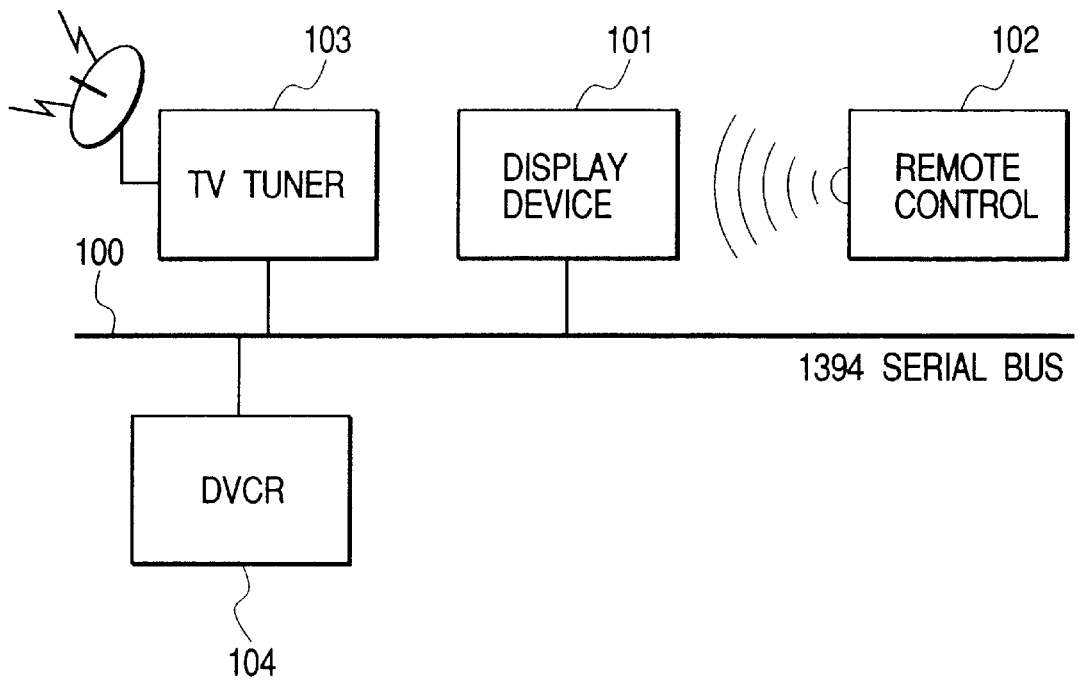
FIG. 1 is a block diagram showing an example of an information processing system according to an embodiment of the present invention.

FIG. 1 is a block diagram showing a configuration of an information processing system according to the embodiment of the present invention.

In FIG. 1, there is shown a display device 101 such as a digital television receiver. A remote control unit (hereinbelow, called the remote control) 102 for remote operation of the display device conducts radio transmission of user-entered instructions to the display device 101.

A tuner 103 receives various types of contents from disc media or through an ISDN communication network, a digital satellite communication network or cable TV network. A digital video recorder (hereinbelow, called the DVCFR) 104 records and reproduces image and audio information efficiently coded using MPEG2, SD-DVCR, HD-DVCR, SDL-DVCR or the like.

In this system, pieces of equipment are connected through a high-speed digital interface to construct a network. Each piece of equipment transfers a stream of data (including one or more image and/or audio information) from a medium to another piece of equipment without impairment of the capability of real-time processing. As an example, this embodiment uses a high-speed digital interface (hereinbelow, called the 1394 interface) connectable to an IEEE 1394 high-speed serial bus 100 that conforms to IEEE1394-1995 and its extended standards.

Figure 2:
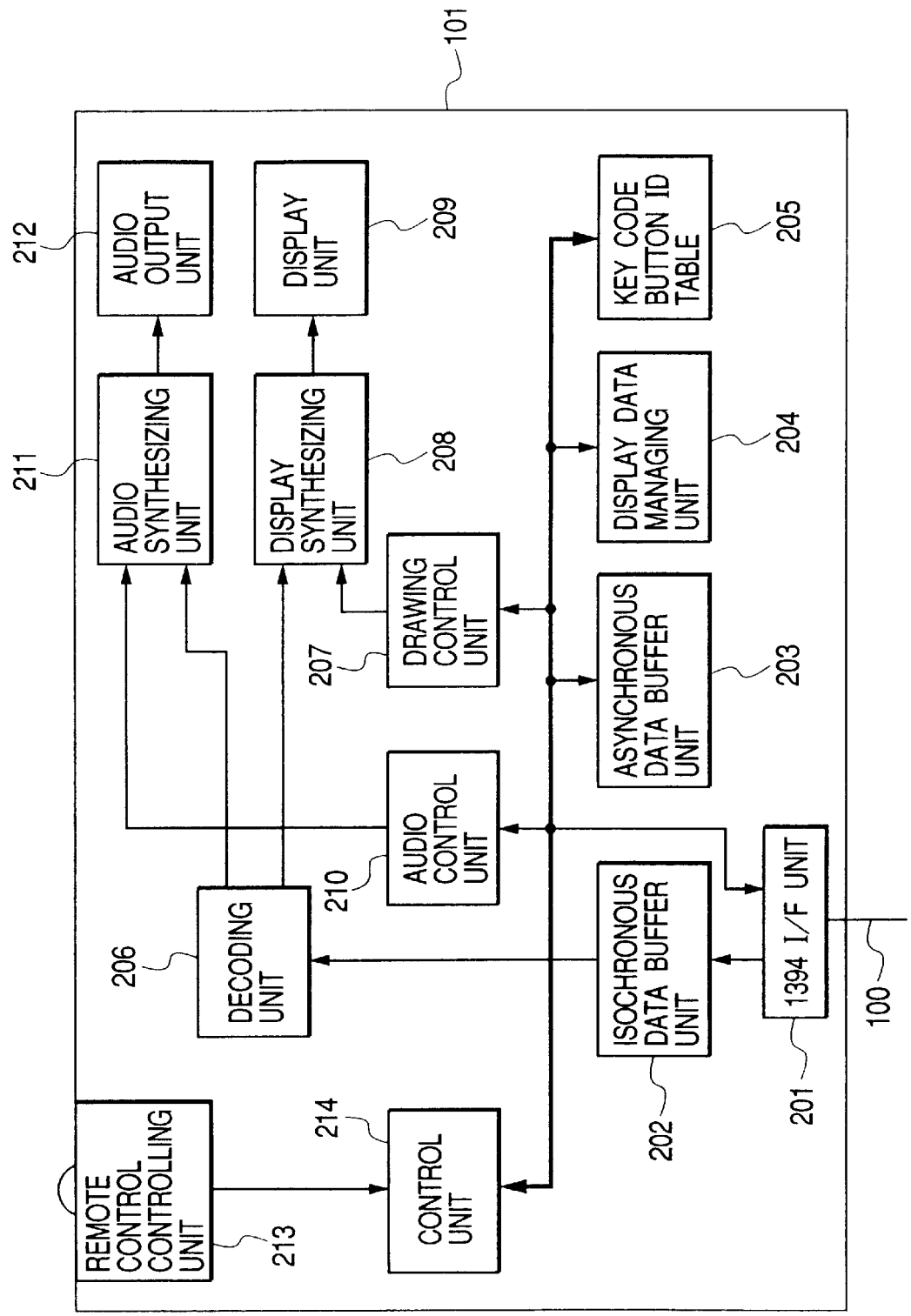
FIG. 2 is a block diagram showing a configuration of a control apparatus according to the embodiment of the present invention.

Referring next to FIG. 2, a configuration of the display device 101 will be described in detail. In the embodiment, the display device 101 serves as a control apparatus for remote operation of controlled apparatuses such as the tuner 103 and the DVCR 104.

A 1394 interface unit 201 is connected to the IEEE 1394 high-speed serial bus 100. The 1394 interface unit 201 uses an AV/C isochronous connection protocol to receive a stream of data from the tuner 103 or the DVCR 104. The 1394 interface unit 201 also uses an AV/C asynchronous connection protocol to receive an operation panel from the tuner 103 or the DVCR 104.

An isochronous data buffer unit 202 stores isochronous packets sequentially received by the 1394 interface unit 201.

An asynchronous data buffer unit 203 stores asynchronous packets sequentially received by the 1394 interface unit 201.

A display data managing unit 204 stores each operation panel (control panel)and its additional information of controlled apparatuses (the tuner 103 and the DVCR 104) in a memory and manages the same.

A key-code button ID table 205 is used to associate a key code corresponding to each operation key of the remote control 102, a function code corresponding to each element of the operation panel, and an element ID of the operation panel with one another for the purpose of management. The method of managing the key-code button ID table will be described later.

A decoding unit 206 resolves the steam of data received by the 1394 interface unit 201 into image and audio data to decode the same using a decoding method corresponding to each data.

A drawing control unit 207 reads a desired operation panel from the display managing unit 204 to control drawing operations to the operation panel. Specifically, the drawing control unit 207 controls each operation panel to determine the drawing position, the drawing area, the drawing time period, the drawing start time, and so on, or determine whether the operation panel can overlay with another operation panel.

An image synthesizing unit 208 synthesizes image data output from the decoding unit 206 and the operation panel output from the drawing control unit 207 within an allowable range for the display unit 209 to make a display. The synthesized image signal is then supplied to a display unit 209. The display unit 209 may be a CRT, a liquid crystal display panel, a plasma display, or the like; it displays image signal from the image synthesizing unit 208.

An audio control unit 210 processes audio data supplied through an internal bus 213. An audio synthesizing unit 211 synthesizes audio data output from the decoding unit 206 and audio data output from the audio control unit 210. The audio synthesizing unit 211 then converts the synthesized digital audio signal back into analog. An audio output unit 212 amplifies the audio signal output from the audio synthesizing unit 211 to output it through a speaker.

A remote control controlling unit 213 uses a radio communications system such as an infrared-ray communications system to communicate with the remote control 102; it decodes a received signal into a key code to be supplied to a control unit 214.

The control unit 214 has a microcomputer and a storage medium; it controls a processing section constituting the display device 101. The control unit 214 controls various types of processing in a comprehensive manner. The processing includes the reception of operation panels from the tuner 103 and the DVCR 104, the display of each operation panel, processing related to remote operation of the operation panels through the remote control 102, and the transmission of operations to each operation panel to a controlled apparatus corresponding to the operation panel.

The data streams received by the display device 101 include video stream data having plural types of image scanning formats. For example, the ATSC (Advanced Television Systems Committee) proposes video stream data having 18 types of formats different in the number of scanning lines, aspect ratio and frame (field) rate.

The display unit 209 in the display device 101 has one or more display scanning modes which provide correspondence with these video stream data. The display synthesizing unit 208 makes a down or up conversion to make the image scanning format of the input stream data correspondent to any of the display scanning modes of the display unit 209.

On the other hand, the drawing control unit 207 changes the resolution (pixels per line) in the display area of the display panel according to the display scanning mode used by the display unit 209. Therefore, the display synthesizing unit 208 can synthesize the display panel and the video stream data in the same display scanning mode.

Figure 3:
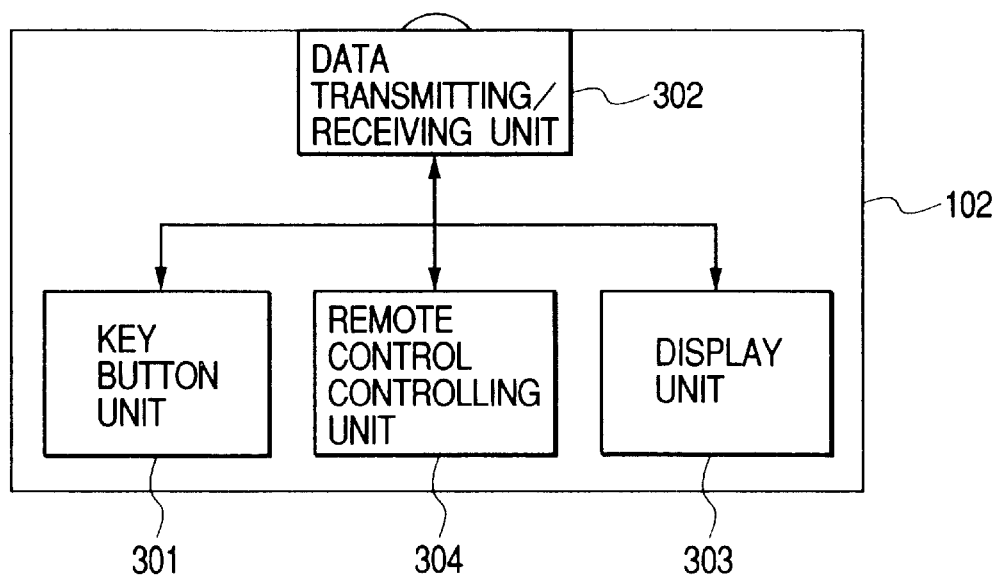
FIG. 3 is a block diagram showing a configuration of a remote control for use in remotely controlling the control apparatus according to the embodiment of the present invention.

Referring next to FIG. 3, an internal arrangement of the remote control 102 will be described in detail.

The remote control 102 according to the embodiment is a multi-function remote control having a learning function that enables the remote control 102 not only to remotely control the display device 101, but also to directly provide remote operation of equipment other than the display device 101. Further, even if the equipment to be controlled is placed in another room, or beyond reach of signals from the remote control, the operation panel of the equipment concerned can be operated to enable remote operation of the equipment.

A key button unit 301 has plural kinds of operation keys. The operation keys enable the user to press an operation key corresponding to desired operation, and hence to given a desired instruction to the display device 101. The key button unit 301 has number keys for entering a number, volume control keys for adjusting the volume of the audio output from the display device 101, cursor keys for moving the cursor on the display panel up, down and sideways, and so on.

A data transmitting/receiving unit 302 encodes a key code corresponding to each operation key to transmit it to the display device 101. The data transmitting/receiving unit 302 also receives response data and the like corresponding to the transmitted data. The remote control 102 and the display device 101 communicate with each other through a radio communications system such as an infrared-ray communications system.

A display unit 303 displays supplementary information for use in supporting the remote operation from the remote control 102, information obtained by the user operating the remote control 102, and the like.

A control unit 304 scans the key button unit 301 to detect which operation key is pressed. The key code corresponding to the detected operation key is encoded by the data transmitting/receiving unit 302, and transmitted to the display device 101. The response data corresponding to the transmitted data is supplied to the control unit 304 through the data transmitting/receiving unit 302. The control unit 304 makes the display unit 303 display the response data if necessary.

Figure 26:
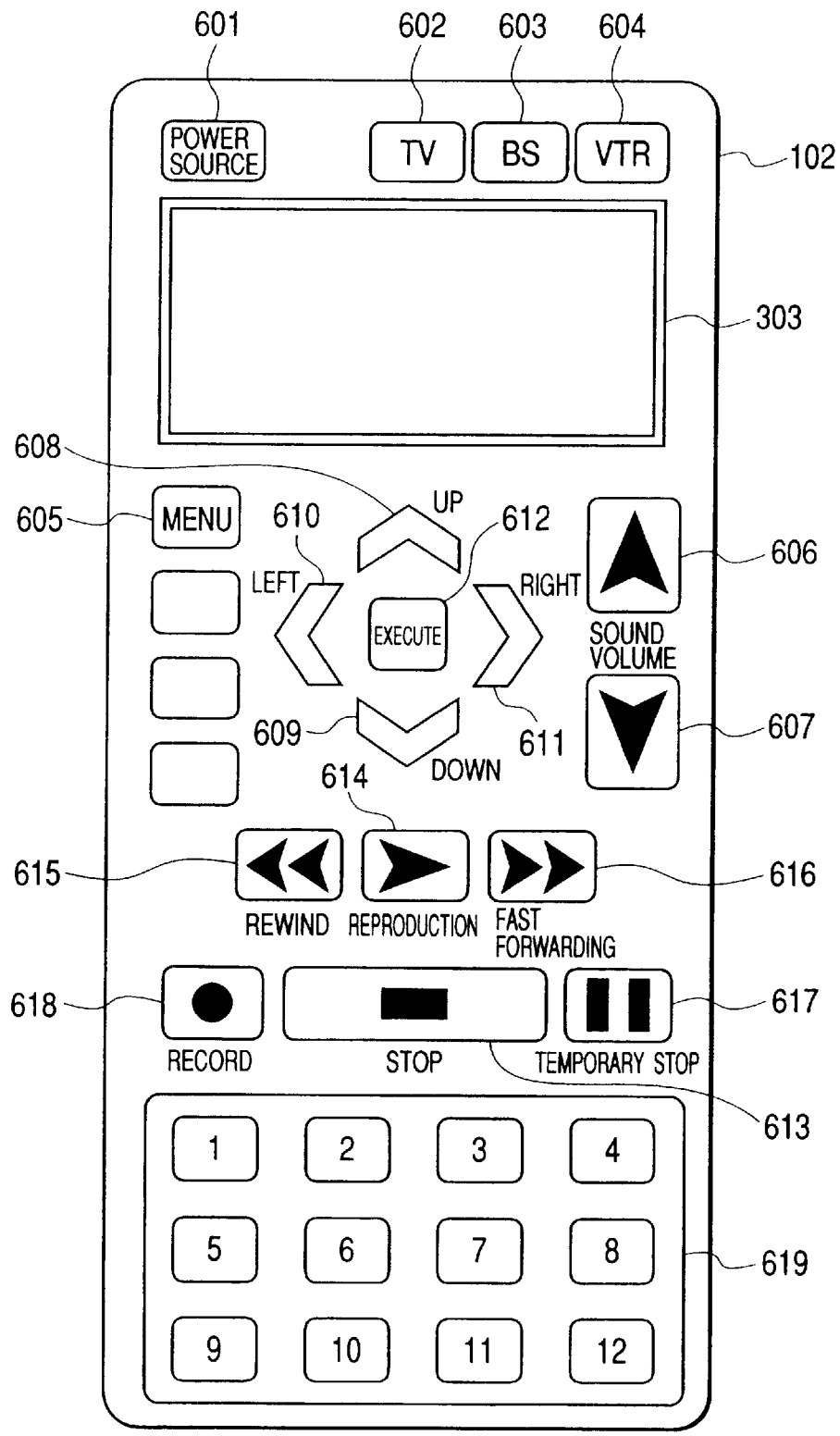
FIG. 26 is an illustration showing a specific arrangement of the remote control according to the embodiment of the present invention.

A specific arrangement of the remote control 102 will be described with reference to FIG. 26. FIG. 26 shows the front side of the remote control 102 on which the key button unit 301 and the display unit 303 are mounted. In FIG. 26, a power key 601 is to operate the power ON/OFF switch. A TV key 602 is validated by the user when he or she starts remote operation of the display unit 101. A BS key 603 is validated when the user directly achieves remote operation of the tuner 103. A VTR key 604 is validated when the user directly achieves remote operation of the DVCR 104.

A menu key 605 is to select an operation panel of a desired controlled apparatus. Volume control keys 606 and 607 are to adjust the volume of audio output. Cursor keys 608 to 611 are to move the cursor on the display screen. Of the cursor keys, the up key 608 and the down key 609 move the cursor up and down, and the left key 610 and the right key 611 move the cursor sideways. An execute key 612 is to instruct execution of processing selected by the cursor.

Various function keys 613 through 618 are to achieve functions of a recording/reproducing apparatus such as the DVCR 104. The stop key 613 is to operate the stop function, the reproduction key 614 is to operate the playback function, the rewind key 315 is to operate the rewinding function, the fast forwarding key 616 is to operate the fast-forwarding function, the temporary stop key 618 is to operate the temporary stop function, and the record key 618 is to operate the recording function. Number keys 619 consist of 12 keys capable of entering numbers from "1" to "12". The user can use these keys to select the contents to be received by the display device 101 or the tuner 103.

Figure 4:
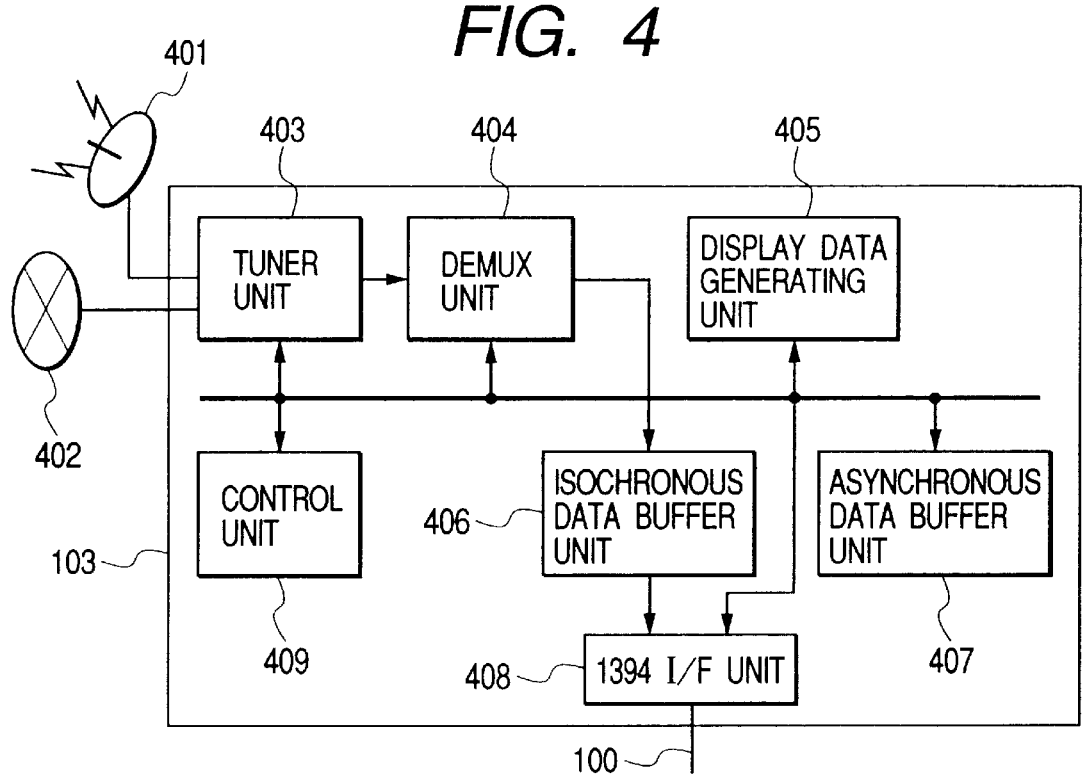
FIG. 4 is a block diagram showing a configuration of one of controlled apparatuses according to the embodiment of the present invention.

Next, a configuration of the tuner 103 will be described in detail with reference to FIG. 4. The tuner 103 according to the embodiment is a controlled apparatus that supplies its own operation panel. Therefore, the user can operate the operation panel with the remote control 102 to remotely control the apparatus. The operation panel is displayed on the display screen of the display unit 101 in accordance with a procedure to be described later.

An antenna unit 401 receives radio waves from a digital satellite network, a surface wave digital broadcast network, and the like. A digital communication network 402 may be an ISDN communication network, a cable TV network, or the like.

A tuner unit 403 selectively receives various types of contents from the ISDN communication network, the digital satellite network, the surface wave digital broadcast network, the cable TV network, and so on. Each content includes image information and audio information coded by a given high-efficiency coding scheme (for example, MPEG2, SD-DVCR, HD-DVCR, SDL-DVCR). A demux unit 404 selects a desired content from the contents received by the tuner unit 403 to output the same.

A display data generating unit 405 generates and stores an operation panel for remotely controlling the tuner 103 itself. The operation panel is graphical user interface (GUI) data made up of images, audio, characters, and the like. The GUI data is constituted of plural GUI elements indicative of remotely controllable functions. Each element has a corresponding function represented by characters, symbols, images, and the like.

An isochronous data buffer unit 406 stores stream data containing one or more contents through a 1394 interface unit 408. An asynchronous data buffer unit 407 stores the operation panel of the tuner 103.

The 1394 interface unit 408 is connected to the above-mentioned IEEE 1394 high-speed serial bus 100. The 1394 interface unit 408 provides real-time transfer of the stream data supplied from the isochronous data buffer unit 406 to the display device 101 using the AV/C isochronous connection protocol. It also provides transfer of the operation panel supplied from the asynchronous data buffer unit 407 to the display device 101 using the AV/C asynchronous connection protocol.

A control unit 409 has a microcomputer to control operations of the tuner unit 403, the demux unit 404, the display data generating unit 405, and the 1394 interface unit 408. The control unit 409 also controls received content selection, desired program selection, operation panel transmission, and the like. Further, the control unit 409 may control operation of an audio processing unit, not shown, provided in the tuner 103. In this case, the audio processing unit can control audio information contained in the received content, such as the volume control and control of the sound field environment setting, to supply the results to the 1394 interface unit 408, or an audio output unit, not shown.

Figure 5:
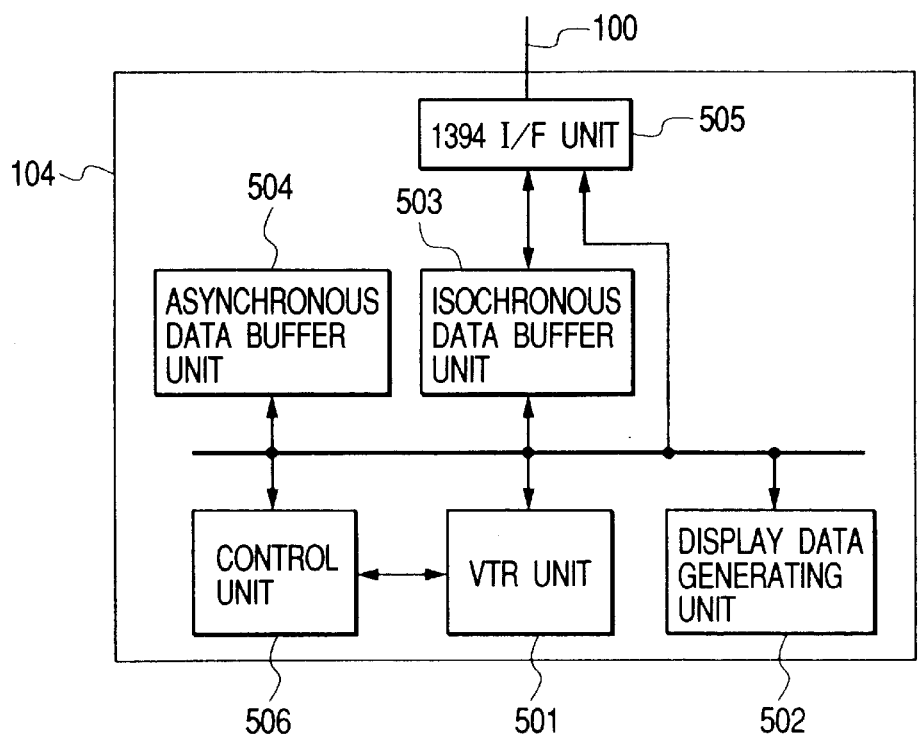
FIG. 5 is a block diagram showing a configuration of another controlled apparatus according to the embodiment of the present invention.

Next, a configuration of the DVCR 104 will be described in detail with reference to FIG. 5. The DVCR according to the embodiment is a controlled apparatus that supplies its own operation panel. Therefore, the user can operate the operation panel with the remote control 102 to remotely control the apparatus. The operation panel is displayed on the display screen of the display unit 101 in accordance with a procedure to be described later.

A VTR unit 501 includes a drive unit for driving a recording medium such as a magnetic tape, a magnetic disk, or a magneto-optical disk, and a modulating/demodulating unit for modulating recorded signals and demodulating reproducing signals. The VTR unit 501 records and reproduces a desired program of each content.

A display data generating unit 502 generates and stores an operation panel for remotely controlling the DVCR 104 itself in the same manner as that in the tuner 103.

An isochronous data buffer unit 503 stores stream data (containing one or more contents) reproduced from the VTR unit 501. It also stores isochronous packets received by a 1394 interface unit 505 in order to supply data contained in each isochronous packet one by one to the VTR unit 501.

An asynchronous data buffer unit 504 stores the operation panel of the DVCR 104.

The 1394 interface unit 505 is connected to the above-mentioned IEEE 1394 high-speed serial bus 100. The 1394 interface unit 505 provides real-time transfer of the stream data supplied from the isochronous data buffer unit 503 to the display device 101 using the AV/C isochronous connection protocol. It also provides transfer of the operation panel supplied from the asynchronous data buffer unit 504 to the display device 101 using the AV/C asynchronous connection protocol.

A control unit 506 has a microcomputer to control operations of the VTR 501, the display data generating unit 502, and the 1394 interface unit 505. The control unit 506 also controls program selection to be recorded or reproduced, operation panel transmission, and the like.

Figure 6:
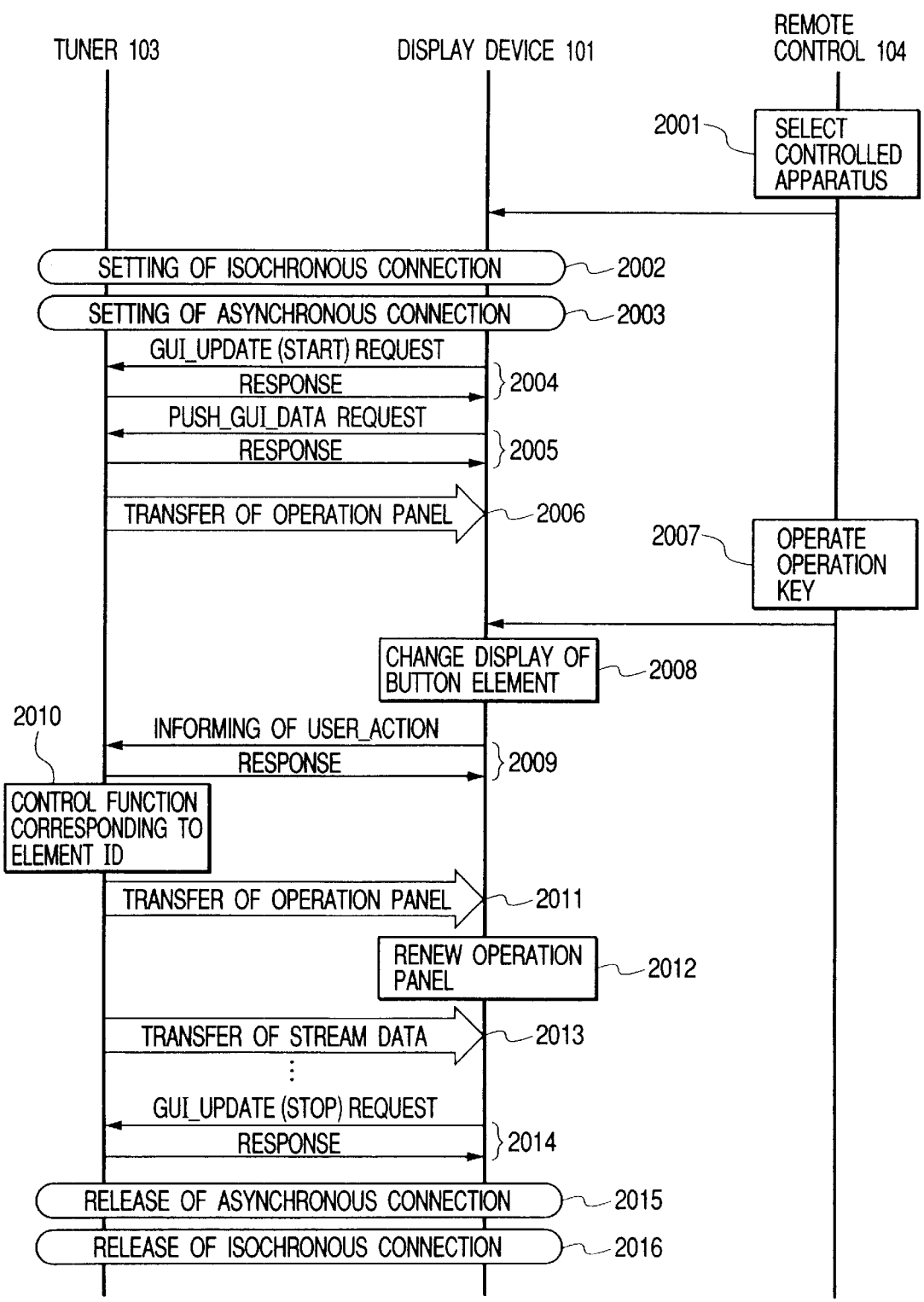
FIG. 6 is an example of a communication procedure in the remote control system according to the embodiment of the present invention.

Referring next to FIG. 6, description is made to a communication procedure in the remote control system according to the embodiment. FIG. 6 shows an example of remote operation of the tuner 103 as one of the controlled apparatuses using the operation panel according to the embodiment.

The user uses the remote control 102 to select a controlled apparatus (the tuner 103 in this case) to be remotely controlled (2001 in FIG. 6)

The 1394 interface unit 201 in the display device 101 sets an isochronous connection with the tuner 103 based on the AV/C isochronous connection protocol (2002 in FIG. 6).

The display device 101 allocates a necessary communication bandwidth and an isochronous channel during isochronous transfer, and sets a point-to-point connection (a one-to-one logical connection) between an output plug of the 1394 interface unit 408 of the tuner 103 and an input plug of the 1394 interface unit 201 of the display device 101. The tuner 103 can thus output a stream of contents required by the display device 101 through the isochronous connection.

After the completion of the isochronous connection, the 1394 interface unit 201 of the display device 101 sets an asynchronous connection with the tuner 103 based on the AV/C asynchronous connection protocol (2003 in FIG. 6).

After the completion of the asynchronous connection, the 1394 interface unit 201 of the display device 101 issues a GUI_UPDATE (start) command to the tuner 103 (2004 in FIG. 6). The GUI_UPDATE (start) command is one of commands for use in controlling communication of the operation panel; it is transferred using a function control protocol to be described later. If the operation panel varies according to the user-entered operation or the like, the command instructs transmission of new display data corresponding to the variation to the control apparatus side. Therefore, the display device 101 can visually reflect the variation appearing on the operation panel. Further, the user can visually recognize a response to the user-entered operation at all times. The effect of the command continues until the tuner 103 receives a GUI_UPDATE (stop) command.

Next, the 1394 interface unit 201 of the display device 101 issues a PUSH_GUI_DATA command to the tuner 103 (2005 in FIG. 6). The command is to request the operation panel from the controlled apparatus; it is transmitted by the function control protocol.

Upon receipt of the PUSH_GUI_DATA command, the display data generating unit 405 of the tuner 103 supplies its own operation panel to the 1394 interface unit 408. The 1394 interface unit 408 in turn provides asynchronous transfer of the operation panel to the display device 101 based on the AV/C asynchronous connection protocol (2006 in FIG. 6).

Figure 15:
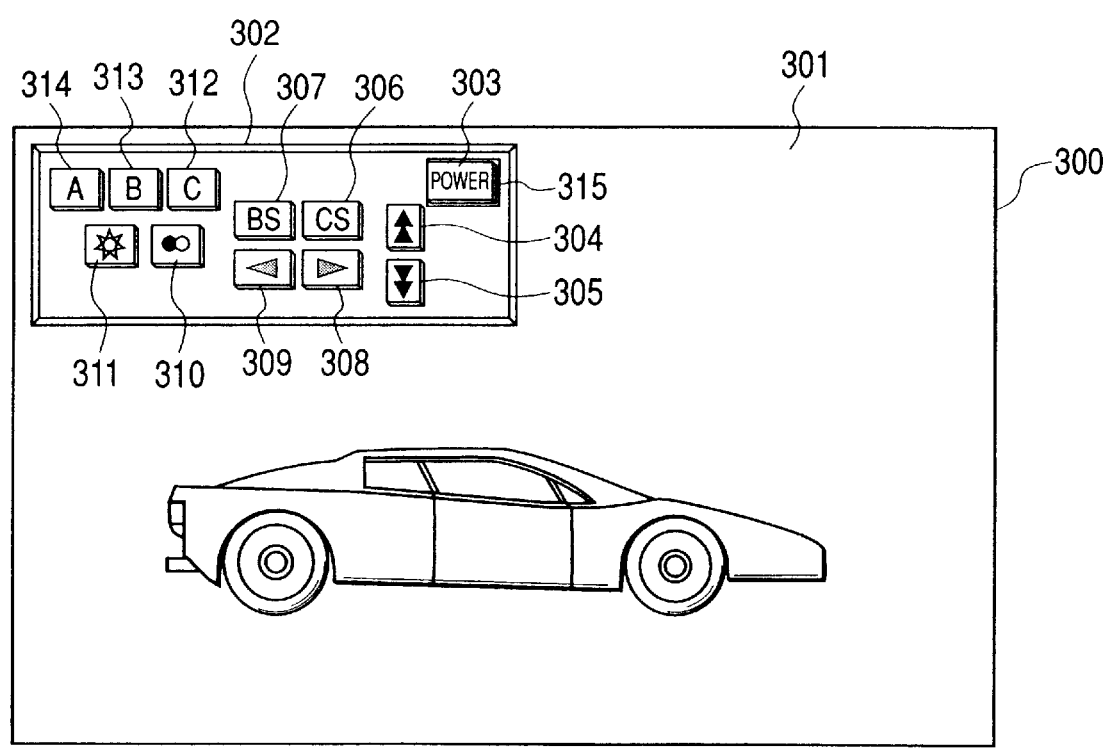
FIG. 15 is an illustration showing an example of a display panel according to the embodiment of the present invention.

Then, the display device 101 displays the operation panel of the tuner 103 by means of the display unit 209. FIG. 15 shows an example of the operation panel of the tuner 103 and its display example. In FIG. 15, there are shown a display screen 300 and stream data 301 currently selected by the display device 101. There is also shown an example of the operation panel 302 of the tuner 103. The panel consists of plural kinds of elements 303 through 314 to be described later. A cursor 315 is shown on the operation panel; it is operated by the cursor keys 608 through 611 provided on the remote control 102.

The above-mentioned procedure allows the user to visually display the operation panel of a desired controlled apparatus on the display device 101 as a control apparatus.

The following describes the process to operate the controlled apparatus using the remote control 102.

The user uses the remote control 102 to position the cursor at one of plural elements and press the execute key 612.

Thus the user can input operation predetermined for the element (user action) (2007 in FIG. 6). FIG. 8 shows types of user actions. The user actions include "select", "depress" and "release". The action "select" (action code "00h") is the action on a panel or icon element; it can be entered by pressing the execute key 612. The action "depress" (action code "01h") and "release" (action code "02h") are the action on a button element; they can be entered by pressing the execute key 612. When it is in a "depressed" state, the button element in question goes into a "released" state; when in the "released" state, the button element goes into the "depressed" state.

When the user operates an element on the operation panel with the remote control 102, the display device 101 changes the display of the element as required (2008 in FIG. 6). It also sends the controlled apparatus side input operation to (user action on) the element as a USER_ACTION command (2009 in FIG. 6). The command has an element ID of the element operated and an action code (see FIG. 8) indicative of the operation (user action) to be performed for the element. The command is then transmitted by the function control protocol.

The control unit 409 of the tuner 103 controls a function of the element indicated by the element ID to be operated in accordance with the user action (2010 in FIG. 6). For example, when the action code indicates "depress", the function is started; when the action code indicates "release", the function is ended.

When a change of operating state in the tuner 103 causes a change on the display panel, the display data generating unit 405 transfers to the display device 101 display panel information corresponding to the change (2011 in FIG. 6). Upon receipt of the display panel information, the display device 101 renews the operation panel (2012 in FIG. 6). On the other hand, when the display of the display panel should be changed without user action, the display panel information is transferred to the display device 101 as well.

If the user operates the operation panel of the tuner 103 to select another content, the control unit 409 of the tuner 103 transfers stream data containing the content to the display device 101 through the above-mentioned isochronous connection (2013 in FIG. 6).

Repeating the above-mentioned procedure, the user operates the display panel with the remote control 102 to achieve desired operation.

After that, if the operation of the tuner 103 on the display panel is ended, the display device 101 issues a GUI_UPDATE (stop) command (2014 in FIG. 6).

The command is sent by the function control protocol.

The 1394 interface unit 201 of the display device 101 releases the asynchronous connection between the display device 101 and the tuner 103 (2015 in FIG. 6), then the isochronous connection between the display device 101 and the tuner 103 (2016 in FIG. 6).

The following describes the GUI elements constituting the operation panel according to the embodiment and the data structure of the GUI elements.

The operation panel transmitted from the controlled apparatus (the tuner 103 or DVCR 104) to the control apparatus (the display device 101) is constituted of a set of several GUI elements for the purpose of providing a graphical operating environment that is easy to understand visually. The GUI elements constituting the operation panel include a panel element, a button element, a text element, an icon element, a range element, and so on. Each GUI element can be represented in a tree structure with the panel element placed in the root segment. It should be noted that all the GUI elements have unique ID codes (hereinbelow, called the element IDs) set therefor.

FIG. 7 shows data structures of various elements. FIG. 7 is a table showing the relationship between element types and data structure of each element. In the table, marks indicate data constituting each element.

First, the panel element will be described. The panel element is an element that defines the structure of the operation panel itself. The user action "select" can be instructed to the element through the remote control 102. The data structure of the panel element hierarchically describes the following as necessary data: an element ID, a link to text data indicative of the element title (or functional description) (label), an element displaying position on the display screen (position), an element displaying size (size), and an element ID for a link to each element to be displayed on the operation panel (element ID queue). Further, the data structure hierarchically describes the following as optional data: background color specification of the element (background color), a link to bitmap data to be displayed on the background of the element (background bitmap link), font specification of a character string to be displayed in the element (font), and an isochronous channel specifying stream data to be displayed in the element (AV channel).

Next, the button element will be described. The button element is an element that defines operation buttons to be displayed on the operation panel. The user action "depress" or "release" can be instructed to the element through the remote control 102. The data structure of the button element hierarchically describes the following as necessary data: the element ID, the label, the position, the size and the functional code. Further, the data structure of the button element hierarchically describes the following as optional data: the font, a link to bitmap data to be displayed at the time of "depress", a link to bitmap data to be displayed at the time of "release", and so on.

Next, the text element will be described. The text element is an element that defines character information such as title and descriptive text to be displayed on the operation panel. The data structure of the text element hierarchically describes, as necessary data, the element ID, the label, the position, the size and a text link, and as optional data, the background color and the font.

Next, the icon element will be described. The icon element is an element that defines icons to be displayed on the operation panel. The user action "select" can be instructed to the element through the remote control 102. The data structure of the icon element hierarchically describes, as necessary data, the element ID, the label, the position, the size and an icon bitmap link, and the font as optional data.

Next, the range element will be described. The range element has a maximum display region and a minimum display region to define a display position within the display range. The data structure of the range element hierarchically describes, as necessary data, the element ID, the label, the position, the size, a maximum value that defines the maximum display region, a minimum value that defines the minimum display region, and a indication value that specifies the position within the display range, and as optional data, the background color and the font.

FIG. 9A is a table showing data structures of the elements such as the panel element and the button element.

In FIG. 9A, a code of each element type is written into the element type. FIG. 14A shows the relationship between the type of each element and the code indicative of the type. An ID code unique to the element is written into the element ID. The length of the element is written into the data length. Data constituting the element are written into the element data in the order from the necessary data to the optional data.

FIG. 9B is a table showing the structure of real data such as text data and bitmap data to be linked to each element.

In FIG. 9B, a code indicative of the type of the real data is written into the element type. FIG. 14B shows the relationship between the type of each element and the code indicative of the type. An ID code unique to the real data is written into the element ID. The length of the real data is written into the data length. Character string data for text data or bitmap data string for bitmap data are written into the real data.

FIG. 10A is a table showing the structure of text link data for a link of text data to each element.

In FIG. 10A, a code indicative of the type of the text data is written into the data type (see FIG. 14B). An element ID of the test data to be linked is written into the element ID.

FIG. 10B is a table showing the structure of text link data for a link of bitmap data to each element.

In FIG. 10B, a code indicative of the type of the bitmap data is written into the data type (see FIG. 14B). An element ID of the bitmap data to be linked is written into the element ID.

FIG. 10C is a table showing the structure of element link data for a link of the panel element to each element data belonging to the panel element.

In FIG. 10C, a code indicative of the type of the element data is written into the element type (seen FIG. 14A). An element ID of the element data to be linked is written into the element ID.

FIG. 11A is a table showing the structure of position coordinate data that specify a display position of the panel element.

In FIG. 11A, x and y coordinates from a reference point at the upper left corner of the display area of the display unit 209 are written into x and y coordinates, respectively.

FIG. 11B is a table showing the structure of position coordinate data indicative of elements other than the panel element.

In FIG. 11B, relative x and y coordinates from a reference point at the upper left corner of the panel element are written into x and y coordinates, respectively. In FIG. 11B, the position coordinates of each element have three levels, namely high, middle and low levels. The x and y coordinates are written in each level. The x and y coordinates are values that represent the element size in units of pixels.

FIG. 12A is a table showing the structure of size data that define the size of the display area of the panel element.

In FIG. 12A, the size data of the panel element have three levels, namely high, middle and low levels. The "width" and "height" are written in each level. The "width" and "height" are values that represent the element size in units of pixels.

FIG. 12B is a table showing the structure of size data of elements other than the panel element.

In FIG. 12B, values that represent the size of each element in units of pixels are written into the "width" and "height".

FIG. 13A is a table showing the structure of color data that specifies background color of each element.

In FIG. 13A, eight bits of color data are written into the color data for each of RGB colors.

FIG. 13B is a table showing the data structure that specifies the font size of text data to be displayed in each element.

In FIG. 13B, a code that specifies the font size is written into the font code (see FIG. 14D).

FIG. 13C is a table showing the structure of data selected as an option for a link to each element.

In FIG. 13C, a code that specifies the type of the data selected as the option is written into the selected data type (see FIG. 14C). Data that specifies the selected data type is written into the selected data.

FIG. 13D is a table showing the structure of data that specifies an isochronous channel for transfer of stream data to be displayed in the panel element.

In FIG. 13D, an isochronous channel and "00B" are written into the channel for the lower 6 bits and the higher 2 bits, respectively.

The following describes the operation panel according to the embodiment.

The operation panel according to the embodiment has three display levels, namely high, middle and low display levels. Each display level is set to automatically change as the operating state of the operator changes over time. The arrangement of the display panel varies according to the display level. For example, the lower the display level, the smaller the display area of the display panel and the smaller the number of elements to be displayed on the display panel. Further, the display position of the element to be displayed on the display panel varies as the display level is lowered.

FIG. 18 shows the relationship between the display levels and the type of button elements. In FIG. 18, marks in the table indicate elements to be displayed in each display level.

Figure 19:
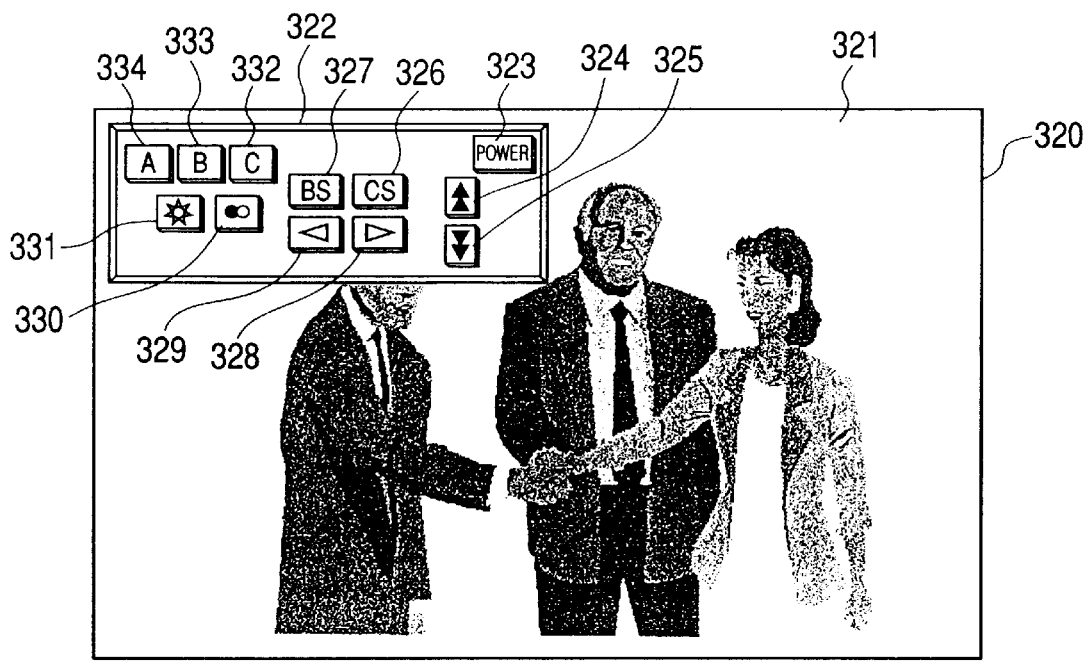
FIG. 19 is an illustration showing a first display example of the display panel.
Figure 20:
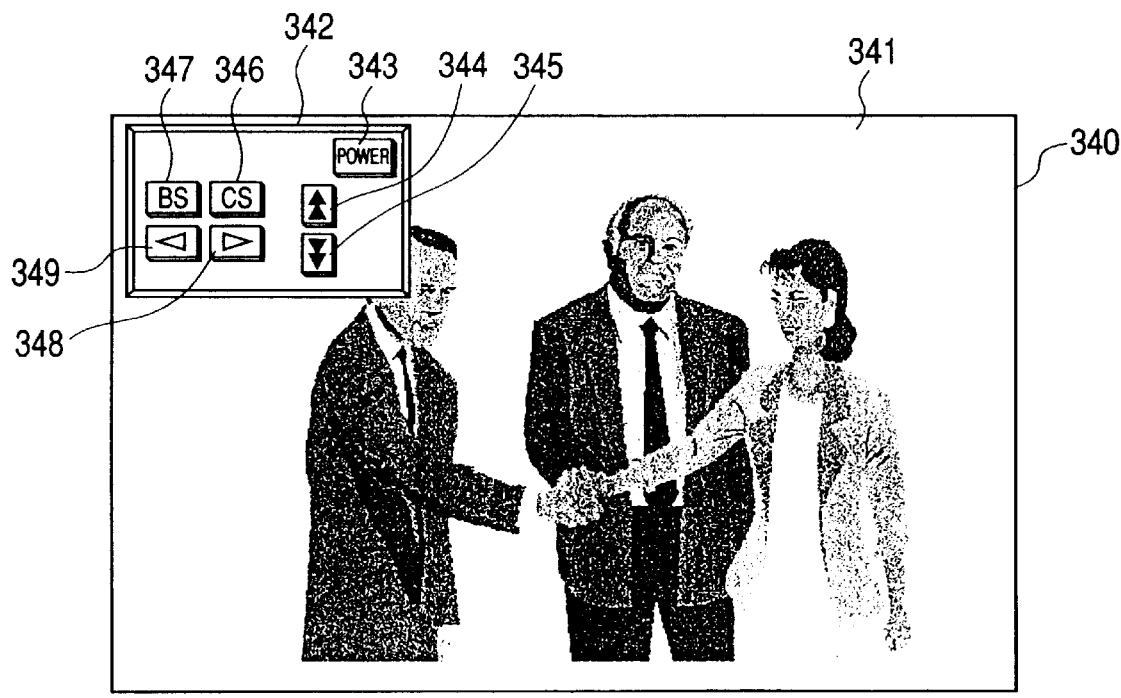
FIG. 20 is an illustration showing a second display example of the display panel.
Figure 21:
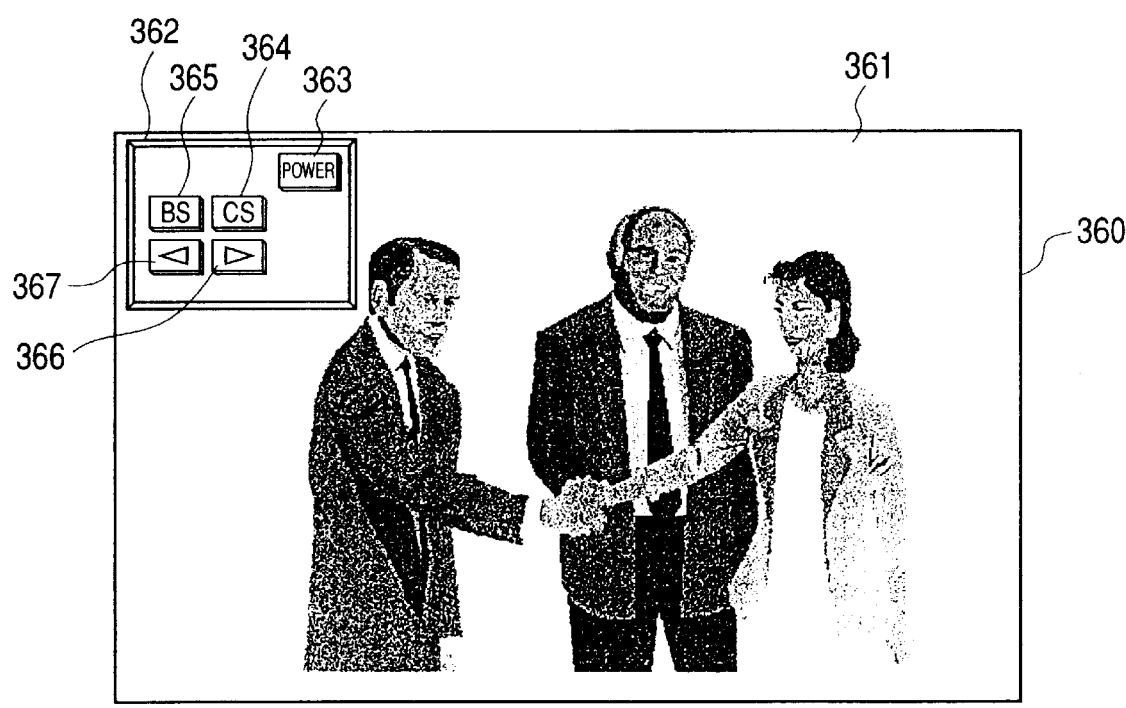
FIG. 21 is an illustration showing a third display example of the display panel.

Referring to FIGS. 19 through 21, the following describes examples of the operation panel according to the embodiment. FIGS. 19 through 21 show the operation panel supplied from the tuner 103 to the display device 101.

FIG. 19 is an illustration showing a display example of the display panel the display level of which is in the high level.

In FIG. 19, the display unit 209 has a display screen 320. On the display screen 320, stream data 321 selected by the display device 101 are shown. The operation panel according to the embodiment is synthesized based on information written in the data structure of the panel element, and displayed in a predetermined position on the display screen while overlapping it upon another display image.

The operation panel consists of one panel element and twelve button elements. The element IDs that specify respective elements are written in the data structure of the panel element.

As shown, a panel element 322 is the basic element of the operation panel. A button element 323 (also called a power button) is to turn on and off the main power of the tuner 103. Button elements 324 and 325 (also called volume buttons) are to control a sound volume adjustment function of the tuner 103. Button elements 326 to 329 (also called channel buttons) are to select a medium or contents to be received. Button elements 330 and 331 (also called color control buttons) are to adjust the color balance of the contents to be received by the tuner 103. Button elements 332 to 334 (also called sound field setting buttons) are to select a sound field environment from plural kinds of preset sound field environments. As shown in FIG. 19, each button element is accompanied with image information that indicates an operable function in such a way that the function can be visually understood.

FIG. 20 is an illustration showing another display example of the display panel the display level of which is in the middle level.

In FIG. 20, the display unit 209 has a display screen 340. On the display screen 340, stream data 341 selected by the display device 101 are shown. The operation panel according to the embodiment is synthesized based on information written in the data structure of the panel element, and displayed in a predetermined position on the display screen while overlapping it upon another display image.

The operation panel consists of one panel element and seven button elements. In FIG. 20, there are shown a panel element 342, a power button 343, volume buttons 344 and 345, and channel buttons 346 to 349. In this example, the color control buttons 330 and 331, and the sound field setting buttons 332 to 334, which are displayed in the high level, are eliminated in this display level.

FIG. 21 is an illustration showing still another display example of the display panel the display level of which is in the low level.

In FIG. 21, the display unit 209 has a display screen 360. On the display screen 360, stream data 361 selected by the display device 101 are shown. The operation panel according to the embodiment is synthesized based on information written in the data structure of the panel element, and displayed in a predetermined position on the display screen while overlapping it upon another display image.

The operation panel consists of one panel element and five button elements. In FIG. 21, there are shown a panel element 362, a power button 363, and channel buttons 364 to 366. In this example, the volume buttons 344 and 345 displayed in the middle level are eliminated in this display level.

FIG. 16 shows an example of the data structure of the panel element 322. The data structure of the panel element 322 is made based on the data structures and various codes shown in FIGS. 9A, 9B, 10A to 10C, 11A, 11B, 12A, 12B, 13A to 13D and 14A to 14D.

The position coordinates of the panel element 322 are fixed values which are written in a region of address offset values ranging from "0Ch" to "0Fh". On the other hand, the size of the panel element 322 varies according to the display level. For each display level, it is written in a region of address offset values ranging from "10h" to "1Bh". For any display level, if the value is "FFFFh", it means that the panel element 322 is eliminated in the level. Links of the panel element 322 with other elements are written in a region of address offset values ranging from "1Ch" to "4Eh".

FIG. 17 shows an example of the data structure of the button elements 323 to 334. The data structure of the button elements 323 to 334 is made based on the data structures and various codes shown in FIGS. 9A, 9B, 10A to 10C, 11A, 11B, 12A, 12B, 13A to 13D and 14A to 14D.

The position coordinates of the button elements 323 to 334 vary according to the display level. For each display level, they are written in a region of address offset values ranging from "0Ch" to "17h". For any display level, if the value is "FFFFh", it means that the button elements 323 to 334 are eliminated in the level. On the other hand, the sizes of the button elements 323 to 334 are fixed values which are written in a region of address offset values ranging from "18h" to "1Bh".

Figure 22:
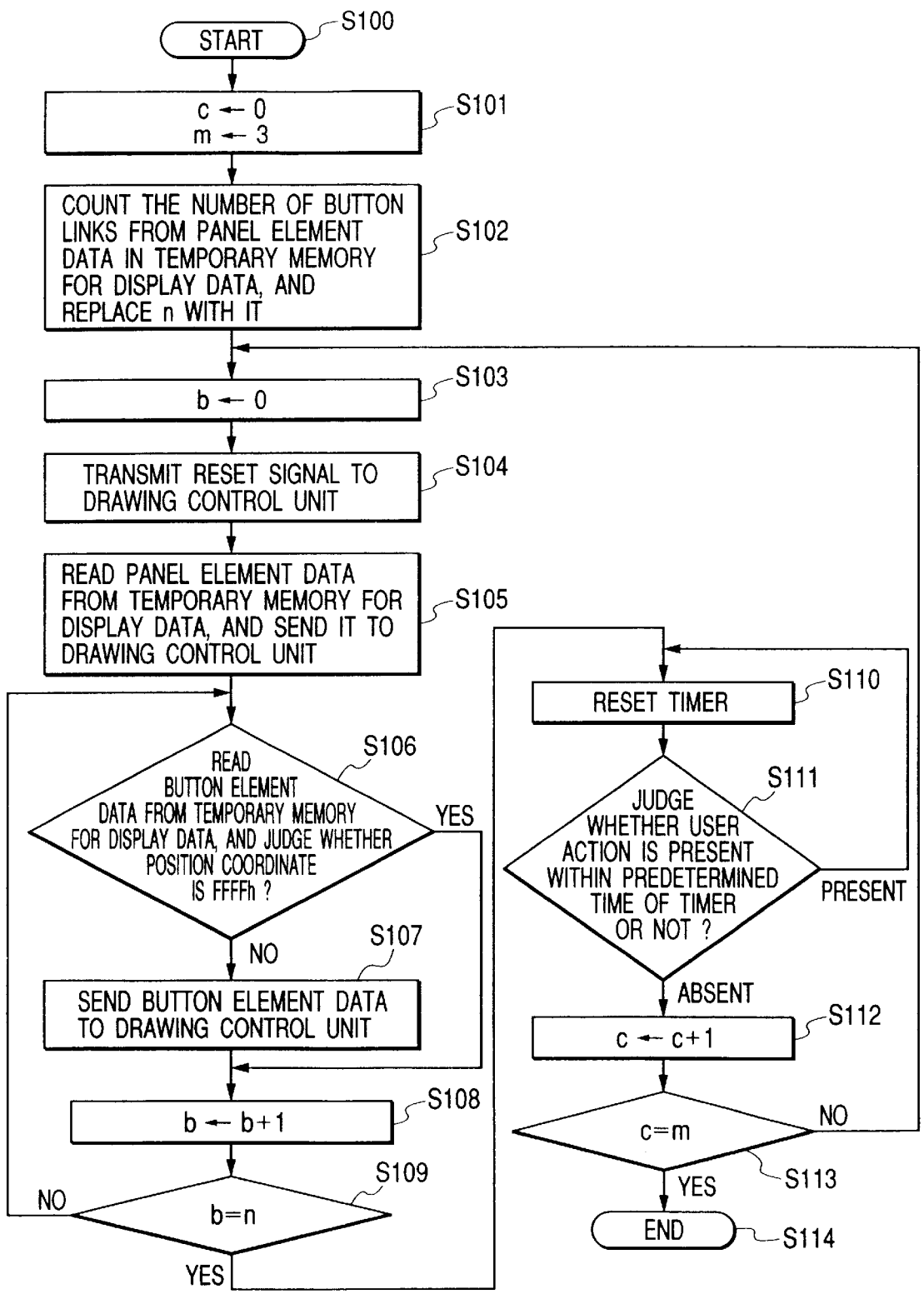
FIG. 22 is a flowchart showing an example of display control of the display panel.

Referring to FIGS. 19 and 22, the following describes the process to display the high-level display panel 322 executed by the display device 101. It should be noted that a display control method shown in FIG. 22 is initiated each time the user requests the display device 101 to display the operation panel.

After receipt of user's request for the display panel of the tuner 103 through the remote control 102, the control unit 214 sets the display level of the operation panel to the high level. At this time, the control unit 214 initializes a count variable c for loop processing to "0" and a variable m to "3" indicative of the lowest display level (step S101). It should be noted that the variable c equal to 0 indicates the high level.

Then, the control unit 214 detects the number of button links from the panel element data (see FIG. 16) so that the maximum element number n will be replaced with the detection result (i.e., the maximum number of button elements) (step S102).

Next, the control unit 214 initializes a count variable b to "0" (step S103). The count variable b corresponds to the number of element data supplied to the drawing control unit 207. Then, the control unit 214 sends the drawing control unit 207 a reset signal so that all the values in a working memory for use in synthesizing the display panel with another display image will be reset to "00h" (step S104).

After that, the control unit 214 reads panel element data for each element whose display level corresponds to the count variable c (i.e., high level), and supplies the read data to the drawing control unit 207 (step S105).

Since the display size of the panel element varies according to the display level, the control unit 214 reads the high-level size from the address offset values "10h" to "13h" in the data structure of the panel element (see FIG. 16). Further, since the display position of each button element varies according to the display level, the control unit 214 reads the high-level coordinate position from the address offset values "0Ch" to "0Fh" in the data structure of each button element (see FIG. 17).

The control unit 214 then judges whether the value of the high-level size or coordinate position is "FFFFh" (step S106). If it is "FFFFh", the operating procedure skips the next step S107, and if not "FFFFh", the control unit 214 supplies corresponding values of the element data to the drawing control unit 207 (step S107). In the embodiment, for the high display level, all the elements have values other than "FFFFh".

After the completion of the operation of step S106 or S107, the control unit 214 increments the count variable b (step S108), and compares the variable b with the maximum element number n (step S109). If not b=n, the operating procedure returns to step S106, and steps S106 to S109 are repeated until all the elements displayable in a certain display level (in the high level in this case) are displayed.

On the other hand, if b=n, the control unit 214 resets its own timer to start counting (step S110). During the counting period, the drawing control unit 207 generates the high-level display panel. Then, the display synthesizing unit 208 synthesizes, as shown in FIG. 19, the display panel with the stream data 321 supplied from the decoding unit 206, and supplies the synthesized image to the display unit 209.

For the high display level, the above-mentioned process allows the display device 101 to display all the elements constituting the display panel.

Referring to FIGS. 20 and 22, the following describes the process to display the middle-level display panel 342.

After the completion of displaying the high-level display panel, the control unit 214 judges whether operation input from the user (user action) is present within a predetermined period of counting executed by the timer (step S111). It should be noted that the predetermined period may be a fixed value preset in the display device 101, or a value manually set by the user.

If no user action is present within the predetermined period, the control unit 214 increments the count variable c to switch the display level of the operation panel from the high level (c=0) to the middle level (c=1) (step S112).

On the other hand, if any user action is present within the predetermined period, the control unit 214 informs the tuner 103 of the user action while resetting the timer (step S110). At this time, the high-level display is continued.

Then, the control unit 214 compares the count variable c with the variable m (step S113). Here, since c=1 and m=3, the control unit 214 executes the operation of step S103.

That is, the control unit 214 initializes the count variable b to "0" (step S103). After that, the control unit 214 sends the drawing control unit 207 the reset signal so that all the values in the working memory for use in synthesizing the display panel with another display image will be reset to "00h" (step S104).

Next, the control unit 214 reads data for each element the display level of which corresponds to the count variable c (i.e., middle level) from the display data managing unit 204 that manages the display panel of the tuner 103. Then, it supplies the read data to the drawing control unit 207 (step S105).

Since the display size of the panel element varies according to the display level, the control unit 214 reads the middle-level size from the address offset values "14h" to "17h" in the data structure of the panel element (see FIG. 16). Further, since the display position of each button element varies according to the display level, the control unit 214 reads the middle-level coordinate position from the address offset values "10h" to "13h" in the data structure of each button element (see FIG. 17). It should be noted here that the display size of each button element does not vary.

The control unit 214 then judges whether the value of the middle-level size or coordinate position is "FFFFh" (step S106). If it is "FFFFh", the operating procedure skips the next step S107, and if not "FFFFh", the control unit 214 supplies corresponding values of the element data to the drawing control unit 207 (step S107). In the embodiment, the color control buttons 330 and 331, and the sound field setting buttons 332 to 334, which are displayed in the high level (see FIG. 19), are eliminated in this display level.

After the completion of the operation of step S106 or S107, the control unit 214 increments the count variable b (step S108), and steps 106 to S109 are repeated until b becomes equal to n (step S109).

If b=n, the control unit 214 resets its own timer to start counting (step S110). During the counting period, the drawing control unit 207 generates the middle-level display panel. Then, the display synthesizing unit 208 synthesizes, as shown in FIG. 20, the display panel with the stream data 341 supplied from the decoding unit 206, and supplies the synthesized image to the display unit 209.

For the middle display level, the above-mentioned process allows the display device 101 to display the operation panel the display area of which is reduced by eliminating the elements for adjusting the audio-visual environment such as the sound field environment and the color balance without reducing the display area of the other elements.

Referring to FIGS. 21 and 22, the following describes the process to display the low-level display panel 362.

After the completion of displaying the middle-level display panel, the control unit 214 judges whether operation input from the user (user action) is present within a predetermined period of counting executed by the timer (step S111). It should be noted that the predetermined period may be a fixed value preset in the display device 101, or a value manually set by the user. Further, the length of the period may be the same as or different from that in the middle level.

If no user action is present within the predetermined period, the control unit 214 increments the count variable c to switch the display level of the operation panel from the middle level (c=1) to the low level (c=2) (step S112).

On the other hand, if any user action is present within the predetermined period, the control unit 214 informs the tuner 103 of the user action while resetting the timer (step S110). At this time, the middle-level display is continued.

Then, the control unit 214 compares the count variable c with the variable m (step S113). Here, since c=2 and m=3, the control unit 214 executes the operation of step S103.

That is, the control unit 214 initializes the count variable b to "0" (step S103). After that, the control unit 214 sends the drawing control unit 207 the reset signal so that all the values in the working memory for use in synthesizing the display panel with another display image will be reset to "00h" (step S104).

Next, the control unit 214 reads data for each element the display level of which corresponds to the count variable c (i.e., low level) from the display data managing unit 204 that manages the display panel of the tuner 103. Then, it supplies the read data to the drawing control unit 207 (step S105).

Since the display size of the panel element varies according to the display level, the control unit 214 reads the low-level size from the address offset values "18h" to "1Bh" in the data structure of the panel element (see FIG. 16). Further, since the display position of each button element varies according to the display level, the control unit 214 reads the low-level coordinate position from the address offset values "14h" to "17h" in the data structure of each button element.(see FIG. 17). It should be noted here that the display size of each button element does not vary.

The control unit 214 then judges whether the value of the low-level size or coordinate position is "FFFFh" (step S106). If it is "FFFFh", the operating procedure skips the next step S107, and if not "FFFFh", the control unit 214 supplies corresponding values of the element data to the drawing control unit 207 (step S107). In the embodiment, the volume buttons 344 and 345, which are displayed in the middle level (see FIG. 20), are eliminated in this display level.

After the completion of the operation of step S106 or S107, the control unit 214 increments the count variable b (step S108), and steps 106 to S109 are repeated until b becomes equal to n (step S109).

If b=n, the control unit 214 resets its own timer to start counting (step S110). During the counting period, the drawing control unit 207 generates the low-level display panel. Then, the display synthesizing unit 208 synthesizes, as shown in FIG. 21, the display panel with the stream data 361 supplied from the decoding unit 206, and supplies the synthesized image to the display unit 209.

If no user action is present within the predetermined period after the completion of displaying the low-level display panel, since c=m, the display control processing is terminated (step S114). At this time, the display device 101 may clear the display panel automatically.

For the low display level, the above-mentioned process allows the display device 101 to display the operation panel the display area of which is further reduced by eliminating the elements for adjusting the sound volume with the minimal elements on the operation panel.

Second Embodiment

The second embodiment is to add, to the information processing system according to the first embodiment, a function for returning the current display level to the original in accordance with the user action. The following mainly describes features of the second embodiment different from those of the first embodiment.

Figure 25:
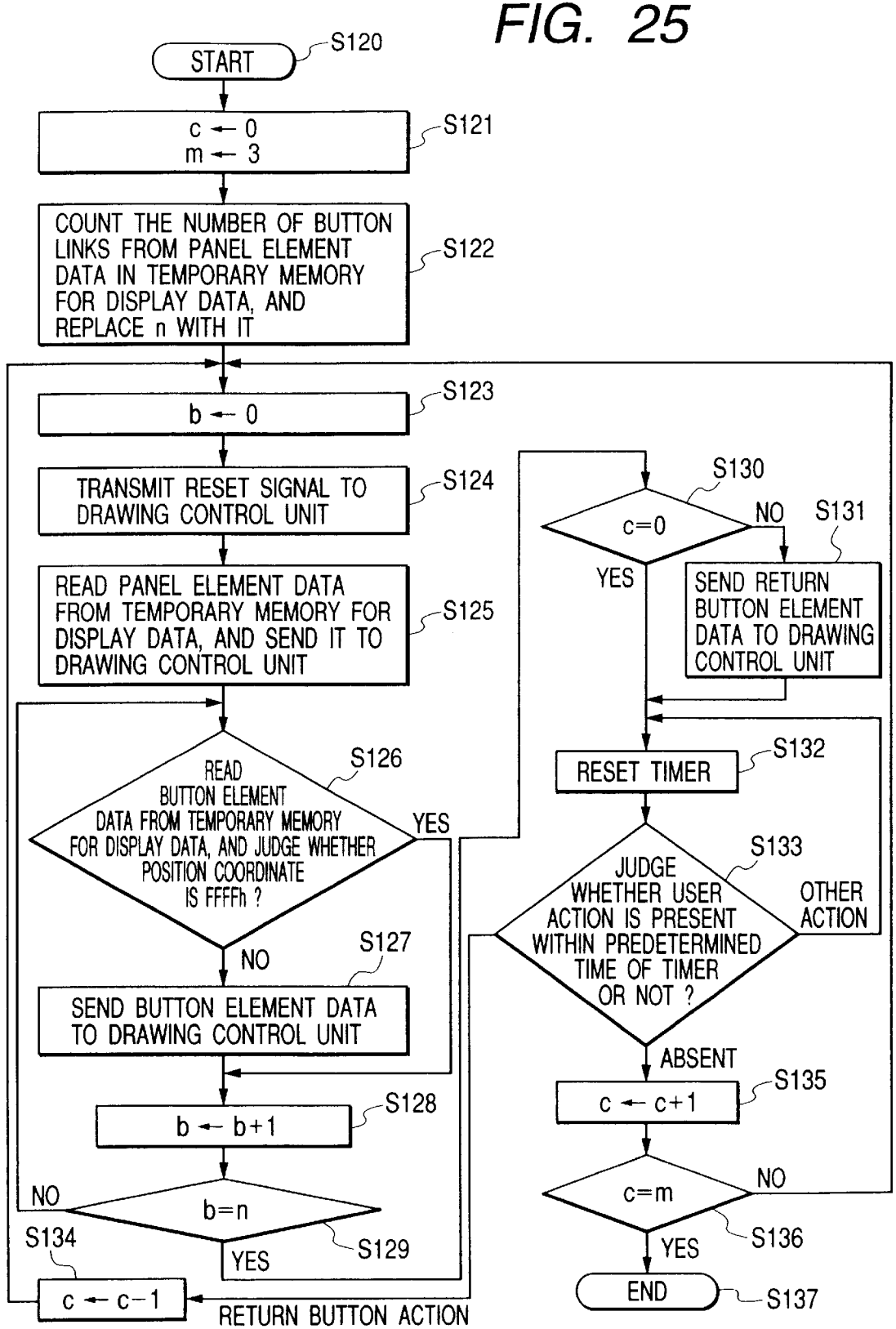
FIG. 25 is a flowchart showing another example of display control of the display panel.

First, the process to display the high-level display panel executed by the display device 101 will be described with reference to FIGS. 19 and 25. It should be noted that a display control method shown in FIG. 25 is initiated each time the user requests the display device 101 to display the operation panel.

A sequence of operations from step S121 to step S129 is the same as the sequence of operations from step S101 to step S109 shown in FIG. 22. Therefore, the high-level display panel is displayed in the same manner as the display panel 322 shown in FIG. 19.

Thus, for the high display level, the above-mentioned process allows the display device 101 to display all the elements constituting the display panel.

Figure 23:
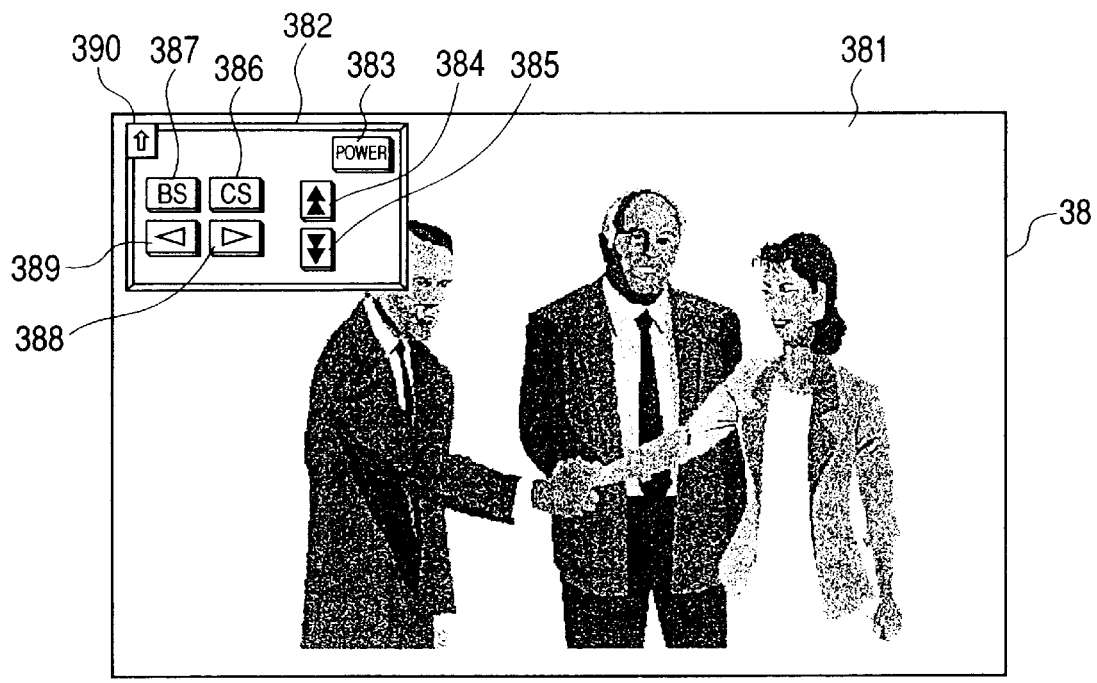
FIG. 23 is an illustration showing a fourth display example of the display panel.

Next, the process to display a middle-level display panel 382 will be described with reference to FIGS. 23 and 25.

After the completion of generating the high-level display panel, the control unit 241 judges whether the count variable c is "0" or not (step S130). Here, since c=0, the control unit 214 determines that the current display is in the high level. Then, it displays the display panel and starts the timer (step S132).

Next, the control unit 214 judges whether operation input from the user (user action) is present within a predetermined period of counting executed by the timer (step S133). It should be noted that the predetermined period may be a fixed value preset in the display device 101, or a value manually set by the user.

If no user action is present within the predetermined period, the control unit 214 increments the count variable c to switch the display level of the operation panel from the high level (c=0) to the middle level (c=1) (step S135).

On the other hand, if any user action is present within the predetermined period, the control unit 214 informs the tuner 103 of the user action while resetting the timer (step S132). At this time, the high-level display is continued.

Then, the control unit 214 compares the count variable c with the variable m (step S136). Here, since c=1 and m=3, the control unit 214 executes the operations from step S123 to step S129. The operations from step S123 to step S129 are the same as those from step S103 to step S109 shown in FIG. 22.

If b=n in step S129, the control unit 214 judges whether the count variable c is "0" or not (step S130). Here, since c is not equal to "0", the control unit 214 determines that the current display level is not the high level. Then, it supplies the drawing control unit 207 with a return button element with which the control unit 214 is provided beforehand (step S131).

The drawing control unit 207 generates the middle-level display panel while synthetically displaying the return button element 390 on the panel. The drawing control unit 207 displays the return button element in such a way as not to be overlapped with any other elements 383 to 389 except for the panel element 382. In the embodiment, the position coordinates of the return button element 390 are made equal to those of the panel element 382. Then, the display synthesizing unit 208 synthesizes, as shown in FIG. 23, the display panel with the stream data 381 supplied from the decoding unit 206, and supplies the synthesized image to the display unit 209. At this time, the control unit 241 resets the timer to start counting (step S132).

If any user action is present within the predetermined period after the completion of displaying the middle-level display panel, the control unit 214 judges whether the user action is directed to the return button element (step S133). If it is directed to the return button element ("select"), the control unit 214 decrements the count variable c (step S134) to execute the sequence of operations from step S123 so as to raise the display level to that immediately above. It should be noted that the user action to the return button element is processed in the display device 101 without informing the tuner 103 of the user action.

If the user action is directed to an element other than the return button element, the control unit 214 informs the tuner 103 of the user action while resetting the timer (step S132).

For the middle display level, the above-mentioned process allows the display device 101 to display the operation panel the display area of which is reduced by eliminating the elements for adjusting the audio-visual environment such as the sound field environment and the color balance. It also allows the display device 101 to raise the display level to that immediately above.

Figure 24:
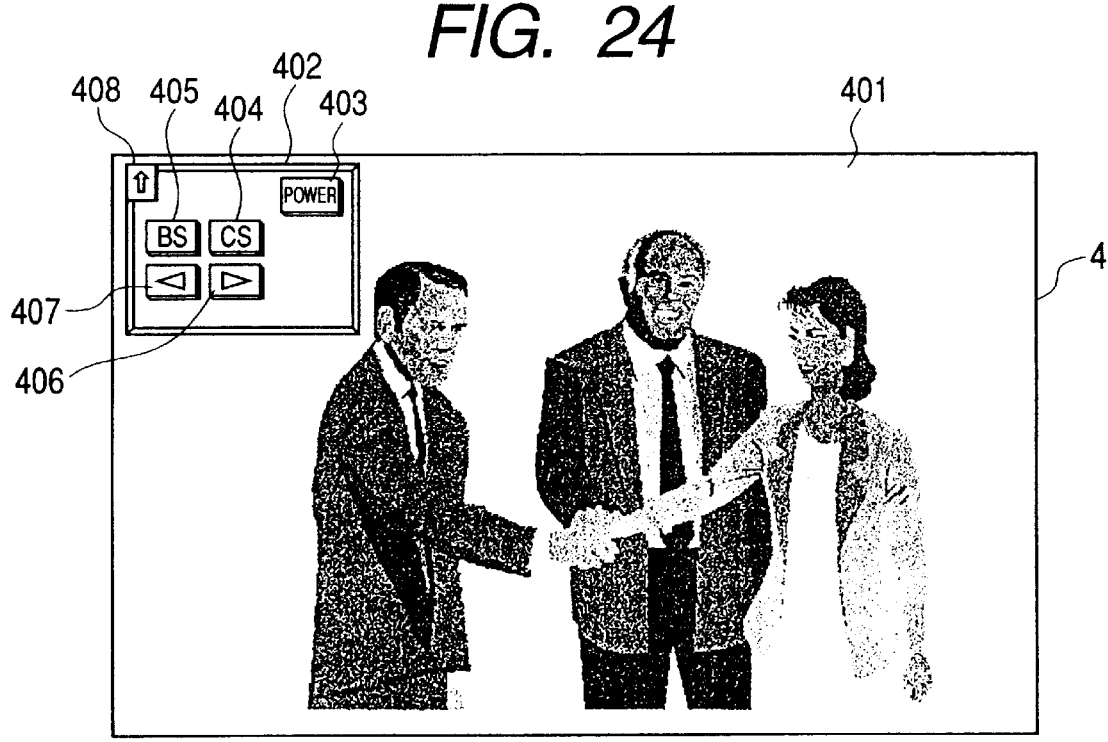
FIG. 24 is an illustration showing a fifth display example of the display panel.

Next, the process to display a low-level display panel 402 will be described with reference to FIGS. 24 and 25.

The control unit 214 judges whether operation input from the user (user action) is present within a predetermined period of counting executed by the timer (step S133). It should be noted that the predetermined period may be a fixed value preset in the display device 101, or a value manually set by the user.

Further, the length of the period may be the same as or different from that in the middle level.

If no user action is present within the predetermined period, the control unit 214 increments the count variable c to switch the display level of the operation panel from the middle level (c=1) to the low level (c=2) (step S135).

On the other hand, if any user action is present within the predetermined period, the control unit 214 informs the tuner 103 of the user action while resetting the timer (step S132). At this time, the middle-level display is continued.

Then, the control unit 214 compares the count variable c with the variable m (step S136). Here, since c=2 and m=3, the control unit 214 executes the operations from step S123 to step S129. The operations from step S123 to step S129 are the same as those from step S103 to step S109 shown in FIG. 22.

If b=n in step S129, the control unit 214 judges whether the count variable c is "0" or not (step S130). Here, since c is not equal to "0", the control unit 214 determines that the current display level is not the high level. Then, it supplies the drawing control unit 207 with a return button element with which the control unit 214 is provided beforehand (step S131).

The drawing control unit 207 generates the low-level display panel while synthetically displaying the return button element 408 on the panel. The drawing control unit 207 displays the return button element 408 in such a way as not to be overlapped with any other elements 403 to 407 except for the panel element 402. In the embodiment, the position coordinates of the return button element 408 are made equal to those of the panel element 402. Then, the display synthesizing unit 208 synthesizes, as shown in FIG. 24, the display panel with the stream data 401 supplied from the decoding unit 206, and supplies the synthesized image to the display unit 209. At this time, the control unit 241 resets the timer to start counting (step S132).

If any user action is present within the predetermined period after the completion of displaying the low-level display panel, the control unit 214 judges whether the user action is directed to the return button element (step S133). If it is directed to the return button element ("select"), the control unit 214 decrements the count variable c (step S134) to execute the sequence of operations from step S123 so as to raise the display level to that immediately above. It should be noted that the user action to the return button element is processed in the display device 101 without informing the tuner 103 of the user action.

If the user action is directed to an element other than the return button element, the control unit 214 informs the tuner 103 of the user action while resetting the timer (step S132).

If no user action is present within the predetermined period after the completion of displaying the low-level display panel, since c=m, the display control processing is terminated (step S137). At this time, the display device 101 may clear the display panel automatically.

For the low display level, the above-mentioned process allows the display device 101 to display the operation panel the display area of which is further reduced by eliminating the elements for adjusting the sound volume with the minimal elements on the operation panel. It also allows the display device 101 to raise the display level to that immediately above.

The following section describes the structure and functions of the IEEE 1394 high-speed serial bus 100 in the information processing system according to the embodiment of the present invention.

The IEEE 1394 high-speed serial bus 100 has the following characteristic functions.

(1) It has a high degree of flexibility in setting connections. The IEEE 1394 high-speed serial bus 100 allows daisy chain connections or combinations of node multi-point connections. This makes it possible to realize a highly flexible network in the connection structure.

(2) It is adaptable to different data transfer rates. The IEEE 1394 high-speed serial bus 100 supports data transfer rates of 100 Mbps, 200 Mbps and 400 Mbps to serially transfer DS-link coded data. Since equipment having a higher transfer rate supports lower transfer rates, various pieces of equipment different in transfer rate can exist together on the network.

(3) It has two different modes called asynchronous transfer and isochronous transfer, respectively. The asynchronous transfer is effective in transferring data (control signals such as commands and file data) to be asynchronously transferred if required. The isochronous transfer is effective in transferring data (stream data such as video and audio data) that require temporal continuity. The asynchronous transfer and the isochronous transfer can exist together in each communication cycle (in general, one cycle is 125 ps). Each transfer mode is initiated after transfer of a cycle start packet (hereinbelow, called CSP) indicative of the start of its cycle. The isochronous transfer has higher priority than the asynchronous transfer. Further, the bandwidth for the isochronous transfer is assured in each communication cycle.

Figure 27:
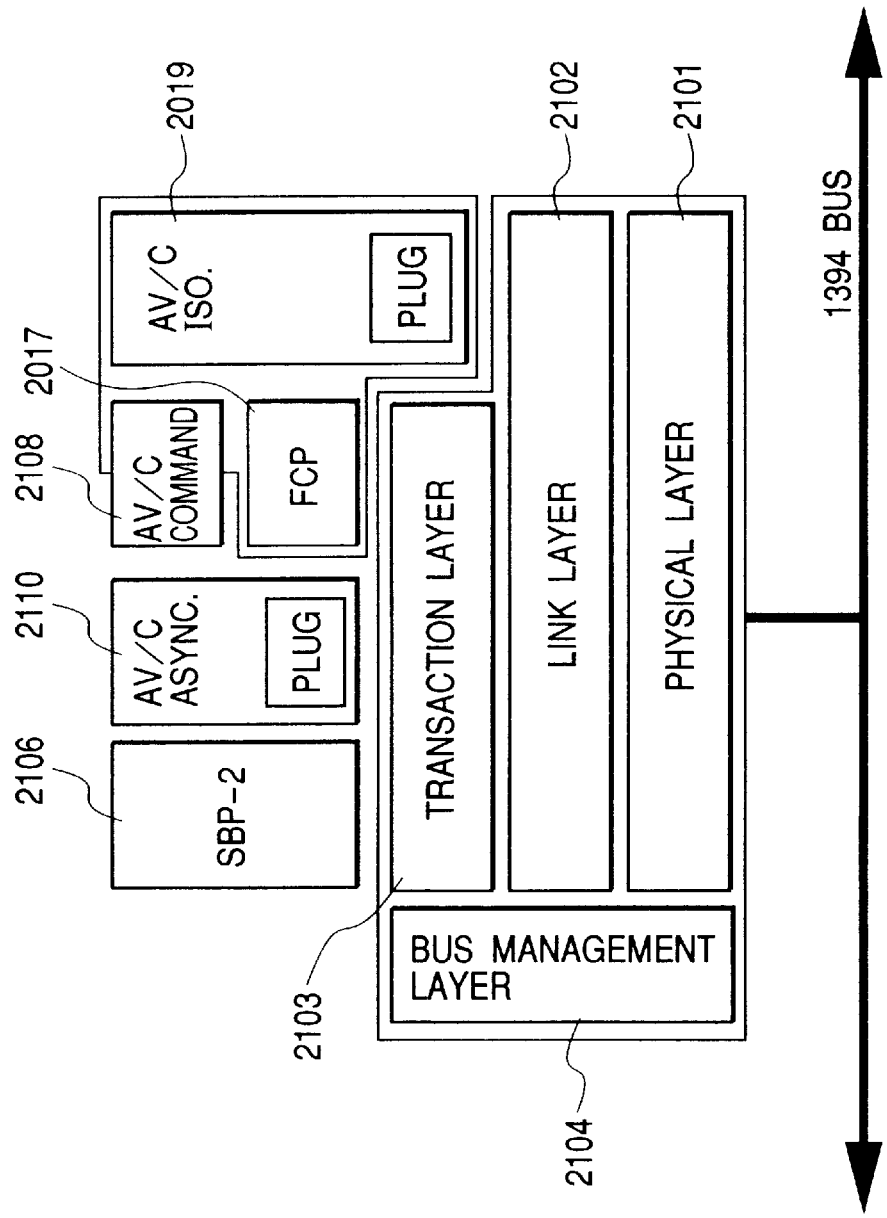
FIG. 27 is a block diagram for explaining a configuration of an IEEE1394 serial bus.

Referring to FIG. 27, the following describes the structure of the 1394 interface units 201, 408 and 505 connected to the IEEE 1394 high-speed serial bus 100 according to the embodiment.

A physical layer 2101 performs adjustment of mechanical or electrical specifications of cables and connectors, coding/decoding of input and output signals, initialization incident to the resetting of the bus, arbitration of bus-use rights, and so on.

A link layer 2102 provides various services necessary for exchanging packet data between the physical layer 2101 and a transaction layer 2103.

The transaction layer 2103 provides three types of transactions, namely, read, write and lock, between the link layer 2102 and upper layers.

A bus management layer 2104 supports three functions, namely node control, isochronous resource management, and bus management. The node management is performed by all the pieces of equipment (also called nodes) connected to the IEEE 1394 high-speed serial bus 100. This function uses IEEE-1212-based control status registers (hereinbelow, called CSRs) mounted in each node to manage the asynchronous transfer between nodes. The isochronous resource management is offered by a node specified as an isochronous resource manager (IRM). This function manages isochronous resources necessary for isochronous communication, i.e., channel numbers and bandwidths. The bus management is offered by a node specified as a bus manager. This function is to perform connection information management (creation of a topology map), speed information management (creation of a speed map), power management, and so on.

The upper layers 2106 to 2110 specify upper communication protocols that are not specified in the IEEE 1394-1995 standard.

Figure 28:
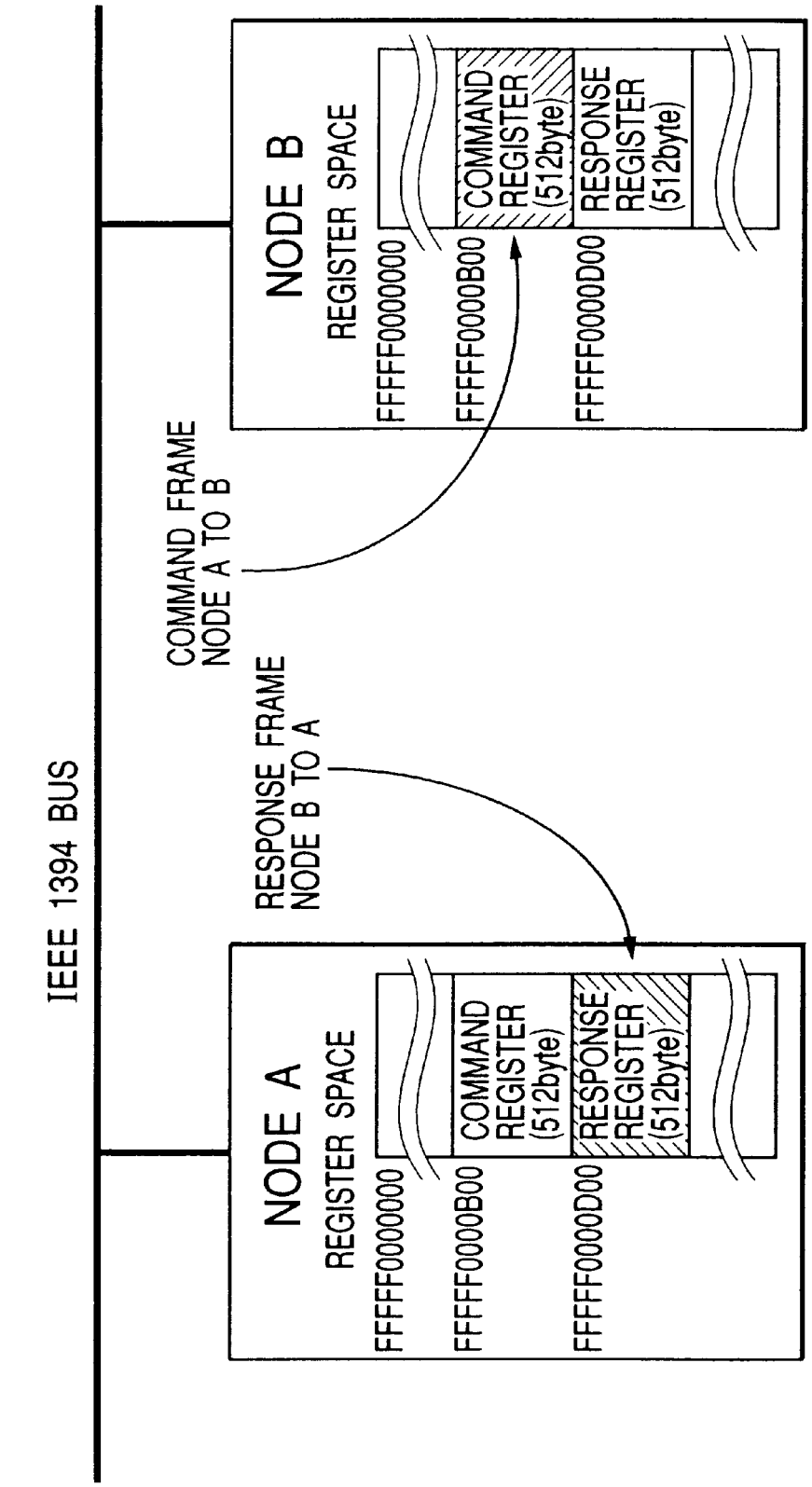
FIG. 28 is a block diagram for explaining an FCP register allocation.

Referring to FIG. 28, the following describes the function control protocol (FCP).

The FCP is a protocol designed to control pieces of equipment (also called nodes) connected to an IEEE 1394 serial bus. The protocol is managed by an upper layer (2107 in FIG. 27) of the transaction layer 2108.

In the FCP, a node for use in controlling the operation of another node is called a "controller", while a node controlled by the controller is called a "target". In FIG. 28, node A is a controller and node B is a target.

An FCP frame transferred from the controller to the target is called a "command frame", while an FCP frame asynchronous-transferred from the target to the controller is called a "response frame". In FIG. 28, the command frame from the node A as the controller is written into a command register of the node B as the target in the process of asynchronous write transaction. On the other hand, the response frame from the node B is written into a response register of the node A in the process of asynchronous write transaction.

As mentioned above, the register into which the command frame is written is called the "command register", while the register into which the response frame is written is called the "response register". Each register exists in a predetermined CSR address space provided in each node. As shown in FIG. 28, the command register exists in a CSR address space of 512 bytes, provided in each node, ranging from "FFFFF0000B00h" to "FFFFF0000CFFh", while the response frame exists in a CSR address space of 512 bytes, provided in each node, ranging from "FFFFF0000D00h" to "FFFFF0000EFFh".

Referring to FIGS. 29A and 29B, the following describes formats of asynchronous packets used in the FCP.

FIG. 29A shows an asynchronous packet for quadlet_write transaction. This packet is used when the above-mentioned FCP frame is 1 quadlet (32 bits). FIG. 29B shows an asynchronous packet for block_write transaction. This packet is used when the above-mentioned FCP frame is 1 quadlet (32 bits) or higher.

When a command frame is to be transmitted, a target node ID is set in a Destination_ID, a controller node ID in a Source_ID, and an address specifying a corresponding command register in a Destination_offset. On the other hand, when a response frame is to be transmitted, the controller node ID is set in the Destination_ID, the target node ID in the Source_ID, and an address specifying a corresponding response register in the Destination_offset.

The following describes an AV/C command set.

An AV/C command set specifies a command (AV/C command) to control operation of so-called AV equipment such as a television set, a monitor and a video recorder, and a response (AV/C response) corresponding to the AC/C command. These are transmitted according to the above-mentioned FCP. The AV/C command set also specifies a set of command and response to control operation of an AV/C isochronous connection protocol or an AV/C asynchronous connection protocol. The AV/C command set is managed by an upper layer (2108 in FIG. 27) of the FCP.

Referring to FIGS. 30 and 31, the following describes data formats of the AV/C command and response frames.

In a "cts" part, "00002" is set to indicate that it is an AV/C command set. A "ctype" part indicates the type of command. The types of commands include CONTROL (for instructing operation), STATUS (for acquiring status), NOTIFY (for informing of a change in status), and so on. "Subunit_type" and "subunit_ID" parts are to specify a subunit to be controlled. A "response" part indicates the type of response. A "opcode" part specifies the contents of control. FIG. 32 shows an example of the contents to be described in the "opcode" part. "Operand" parts [O] to [n] are defined based on the contents of the "ctype" and "opcode" parts.

The following describes the AV/C isochronous connection protocol. The AV/C isochronous connection protocol is one of communication protocols for real-time transfer of stream data such as video data and audio data by using one or more isochronous packets.

The AV/C isochronous connection protocol is managed by an upper layer (2109 in FIG. 27) of the link layer 2102. This protocol uses the concept of plug to manage a logical connection between nodes (hereinbelow, called a "connection") and a flow of transferred stream data (hereinbelow, called "isochronous data").

Referring to FIG. 33, the following describes the structure of a plug control register for managing the above-mentioned plug.

The plug control register exists in a predetermined address space within the CSR; it can access to other registers through the process of asynchronous transfer. The plug control register consists of registers for managing one or more output plugs and registers for managing one or more input plugs. The output plugs use an address space from "FFFFF0000900h" to "FFFFF000097Ch", while the input plugs use an address space from "FFFFF0000980h" to "FFFFF00009FCh".

Referring to FIG. 34, the following describes the structure of an oMPR (output master plug register).

The oMPR is a register for managing all the output plugs; it uses an address of "FFFFF0000900h". In the oMPR, "Data rate capability" indicates the maximum transfer rate (100 Mbps, 200 Mbps, 400 Mbps) of the isochronous data output from the output plug. "Broadcast channel base" is used when a broadcast-out connection is established; it indicates a base of isochronous channel numbers. "Number of output plug" indicates the number of output plugs mounted in the node.

Referring to FIG. 35, the following describes the structure of oPCRs (output plug control registers) [1] to [30] shown in FIG. 33.

The oPCRs [1] to [30] are registers for managing corresponding output plugs respectively; they use an address space from "FFFFF0000904h" to "FFFFF000097Ch". In the oPCR, "on-line" indicates either on-line or off-line. "Broadcast connection counter" becomes "1" if a broadcast-out connection exists or "0" if not exist. "Point-to-point connection counter" indicates the number of point-to-point connections (i.e., the number of nodes connected with the output plug concerned on a one-to-one basis). "Channel number" indicates the channel number used by the output plug concerned. "Data rate" indicates the transmission rate of isochronous data output from the output plug concerned. "Overhead ID" indicates the bandwidth of isochronous data output from the output plug concerned. "Pay load" indicates the maximum value for the number of quadlets in a data block (the remaining portion excluding the header and data CRC) of isochronous packet data output from the output plug concerned.

Referring to FIG. 36, the following describes the structure of an iMPR (input master plug register) shown in FIG. 33.

The iMPR is a register for managing all the input plugs; it uses an address of "FFFFF0000980h". In the iMPR, "Data rate capability" indicates the maximum transfer rate (100 Mbps, 200 Mbps, 400 Mbps) of the isochronous data input from the input plug. "Number of input plug" indicates the number of input plugs mounted in the node.

Referring to FIG. 37, the following describes the structure of iPCRs (input plug control registers) [1] to [30] shown in FIG. 33.

The iPCRs [1] to [30] are registers for managing corresponding input plugs respectively; they use an address space from "FFFFF0000984h" to "FFFFF00009FCh". In the iPCR, "on-line" indicates either on-line or off-line. "Broadcast connection counter" becomes "1" if a broadcast-out connection exists or "0" if not exist. "Point-to-point connection counter" indicates the number of point-to-point connections (i.e., the number of nodes connected with the input plug concerned on a one-to-one basis). "Channel number" indicates the channel number used by the input plug concerned.

AV/C isochronous connection protocol uses any one of (1) point-to-point connection, (2) overlay point-to-point connection, (3) broadcast-out connection, (4) overlay broadcast-out connection, (5) broadcast-in connection, and (6) overlay broadcast-in connection to set a connection between nodes so as to manage a flow of isochronous data.

Figure 38:
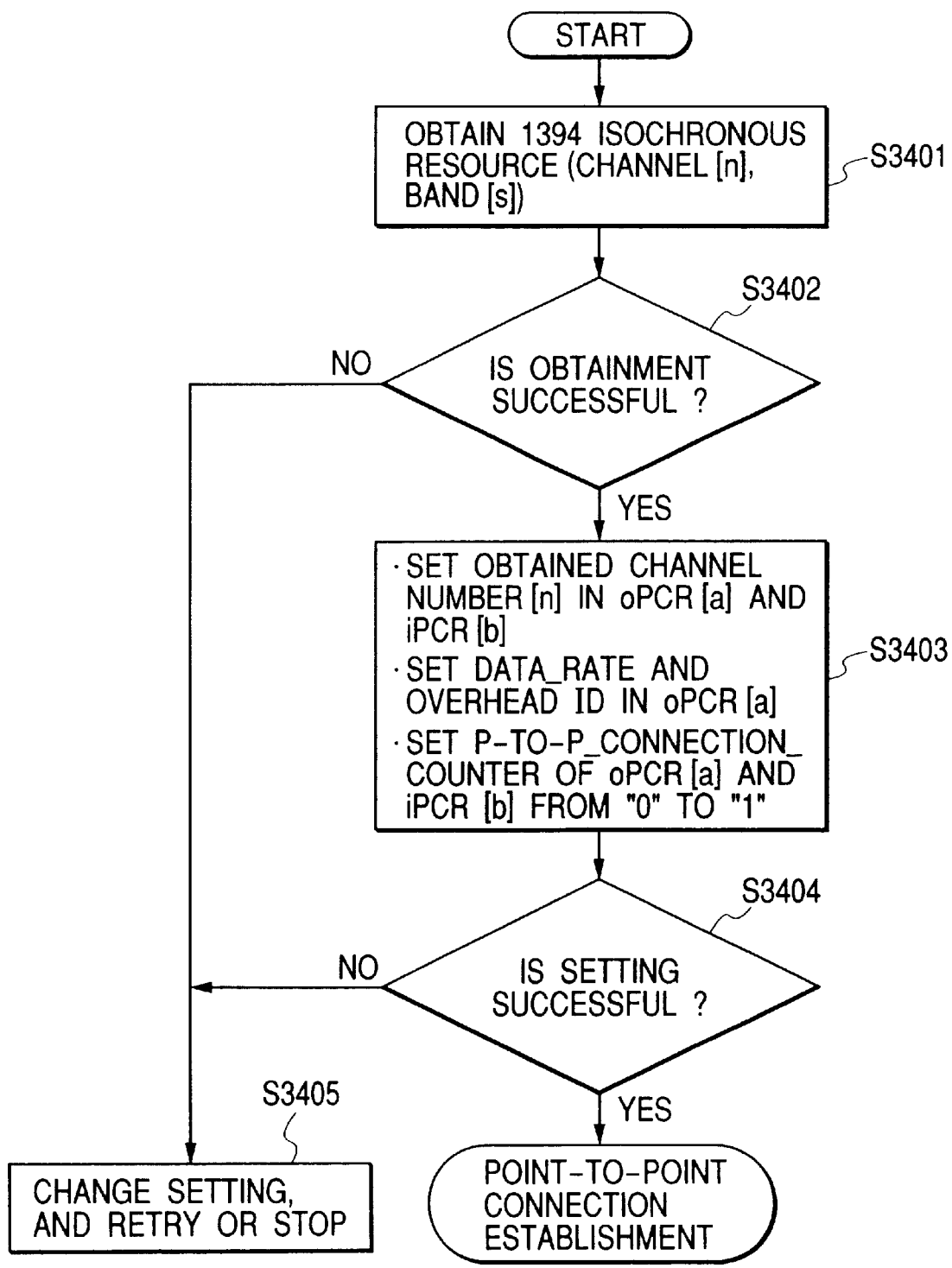
FIG. 38 is a flowchart for explaining a point-to-point connection in the AV/C isochronous connection protocol.

First, the process to set a point-to-point connection will be described with reference to FIG. 38. The point-to-point connection is to connect an unused input plug to an unused output plug on a one-to-one basis through a corresponding isochronous channel. This connection is so protected that only the person who set the connection can release it.

Nodes between which the point-to-point connection is to be established perform the lock transaction for channel register and bandwidth available register managed by the above-mentioned IRM to obtain isochronous resources (i.e., channel number [n] and bandwidth [s] necessary for transfer) (step S3401).

If the channel number [n] to be obtained has already been used, or if the bandwidth [s] to be obtained is not available, or if writing into each register has not been permitted, it is determined that obtainment of the isochronous resources is failed (step S3402). In this case, a retry is performed after channel number or bandwidth setting is changed, or the processing is terminated (step S3405).

If obtainment of the isochronous resources is successful (step S3402), the channel number [n] obtained through the process of the lock transaction is written into both the oPCR [a] of the node [A] and the iPCR [b] of the node [B]. On the other hand, the bandwidth [s] and the transfer rate obtained are written into the oPCR [a] through the process of the lock transaction. Simultaneously, the point-to-point connection counters of the oPCR [a] and the iPCR [b] are changed from "0" to "1" (step S3403).

If writing was done to a plug currently in use, or if the plug concerned does not exist, it is determined that writing into each register is failed (step S3404). In this case, a retry is performed after the plug to be used is changed to another, or the processing is terminated (step S3405).

If writing is successful (step S3404), the point-to-point connection is established between the oPCR [a] of the node [A] and the iPCR [b] of the node [B]. This makes it possible for the node [A] to output isochronous data of the channel number [n] through the output plug (oPCR [a]), and for the node [B] to input isochronous data of the channel number [n] through the input plug (iPCR [b]).

Figure 39:
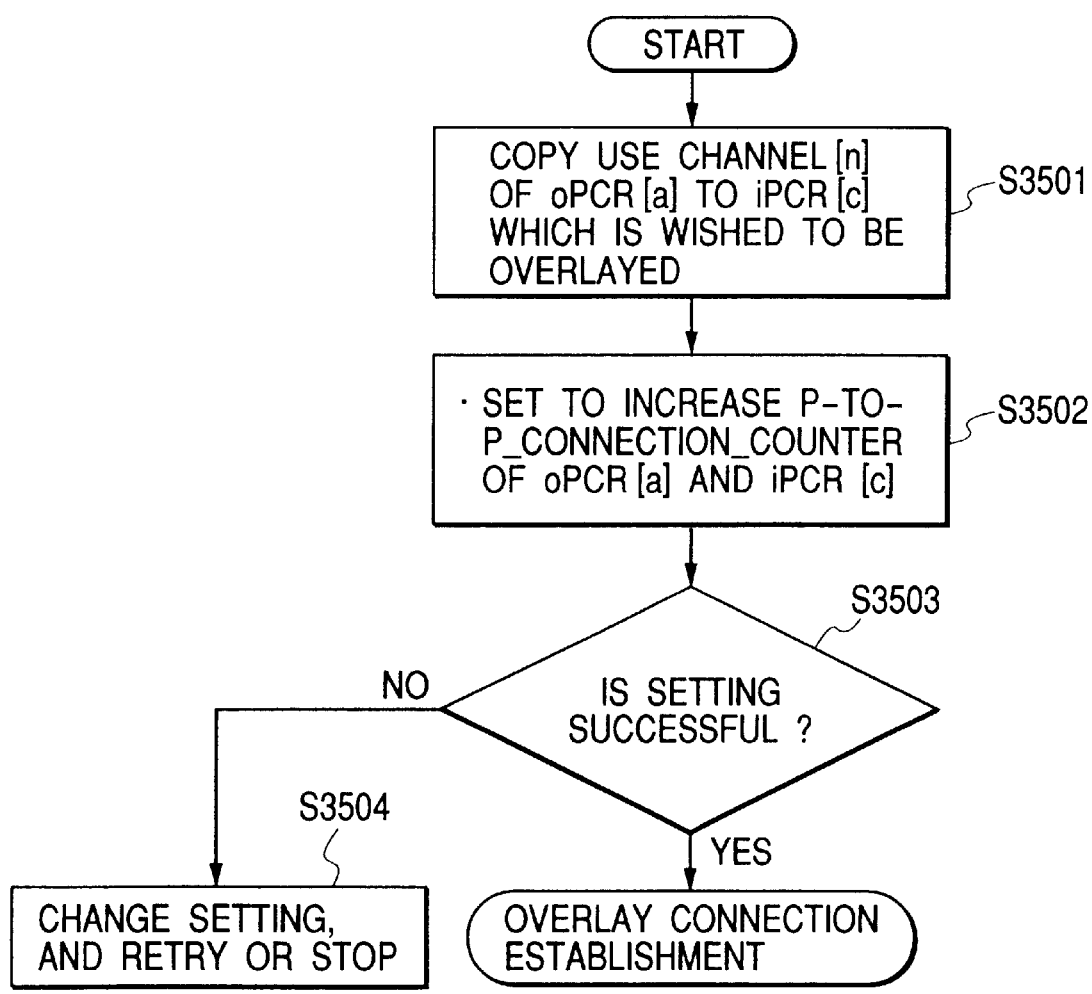
FIG. 39 is a flowchart for explaining an overlay point-to-point connection in the AV/C isochronous connection protocol.

The following describes the process to set an overlay point-to-point connection with reference to FIG. 39. The overlay point-to-point connection is to add, to the point-to-point connection already established, another point-to-point connection. This connection is set between an output plug currently in use and an unused input plug. Further, this connection is so protected that only the person who set the connection can release it.

As an example, the following description is made to a case where an input plug of a node (C) is overlaid by the point-to-point connection (with respect to the channel number [n] and bandwidth [s]) already established between the output plug of the node [A] and the input plug of the node [B].

A Node (node [C]) with which the overlay point-to-point connection is to be established makes a copy of the channel number of the oPCR [a] of the node [A] to an iPCR [c] of the node [C] which is wished to be overlaid (step S3501).

Then, using the lock transaction, the point-to-point connection counters of the oPCR [a] of the node [A] and the iPCR [b] of the node [B] are incremented (step S3502).

If writing into the point-to-point connection counters are failed (step S3505), a retry is performed after setting values are changed, or the processing is terminated (step S3504).

If writing into the point-to-point connection counters is successful (step S3503), the overlay point-to-point connection is established. This makes it possible for the node [C] to receive isochronous data of the channel number [n] output from the output plug (oPCR [a]) through the input plug (iPCR [c]).

Figure 40:
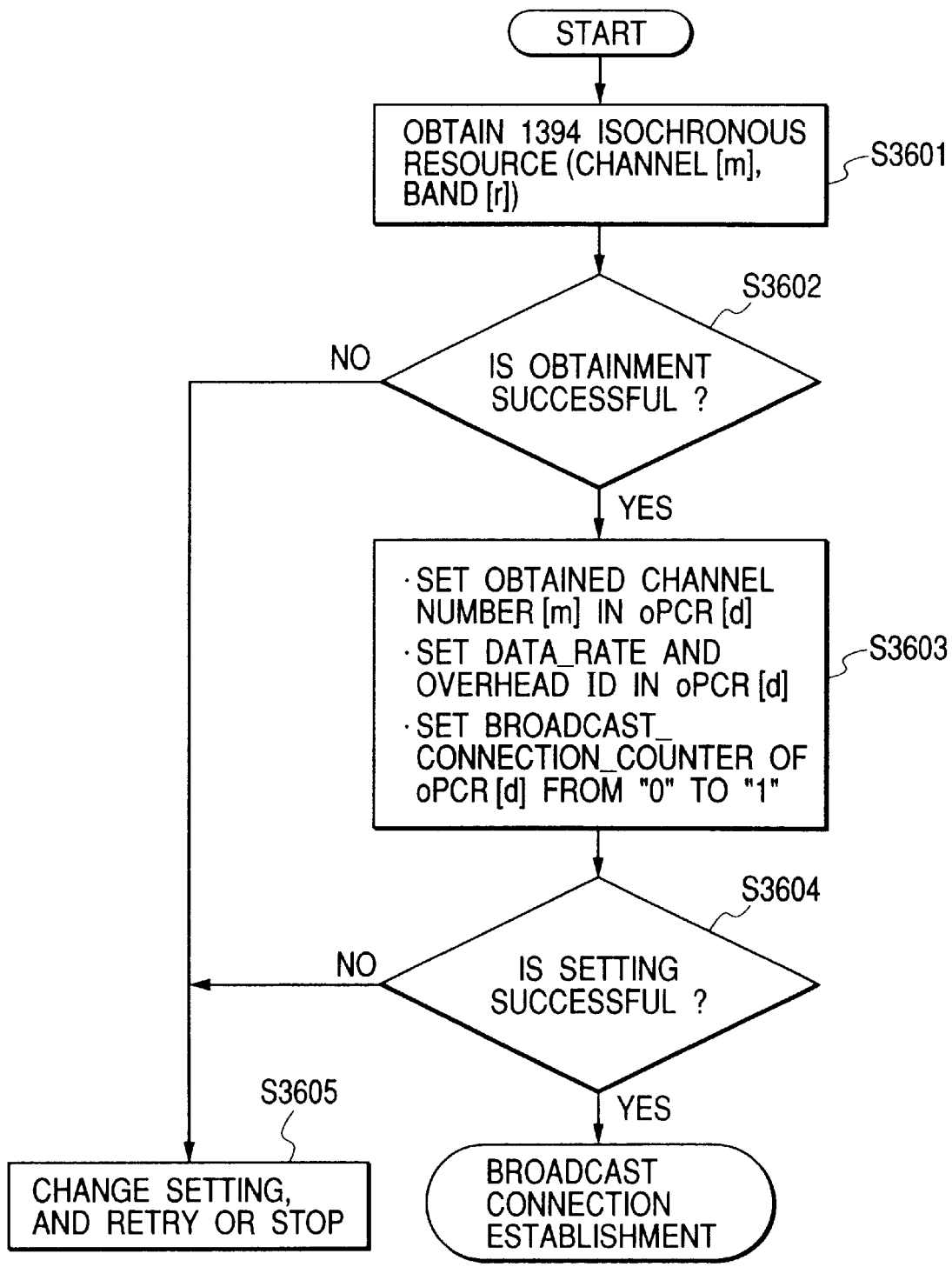
FIG. 40 is a flowchart for explaining a broadcast-out connection in the AV/C isochronous connection protocol.

The following describes the process to set a broadcast-out connection with reference to FIG. 40. The broadcast-out connection is to provide correspondence between an unused isochronous channel and an unused output plug to which no connection is established. Unlike the above-mentioned connections, this connection is unprotected.

A node to which the broadcast-out connection is to be established performs the lock transaction for channel register and bandwidth available register managed by the above-mentioned IRM to obtain isochronous resources (i.e., channel number [m] and bandwidth (r) necessary for transfer) (step S3601).

If obtainment of the isochronous resources is failed in the same manner as in the above-mentioned point-to-point connection (step S3602), a retry is performed after channel number or bandwidth setting is changed, or the processing is terminated (step S3605).

If obtainment of the isochronous resources is successful (step S3602), the channel number [m], the bandwidth [r] and the transfer rate obtained through the process of the lock transaction are written into an oPCR [d] of a node [D]. Simultaneously, the broadcast connection counter of the oPCR [d] is changed from "0" to "1" (step S3603).

If writing is failed in the same manner as in the above-mentioned point-to-point connection (step S3604), a retry is performed after the plug to be used is changed to another, or the processing is terminated (step S3605).

If writing is successful (step S3604), the broadcast-out connection is established to the oPCR [d] of the node [D]. This makes it possible for the node [D] to broadcast isochronous data of the channel number [m] through the output plug (oPCR [d]).

Figure 41:
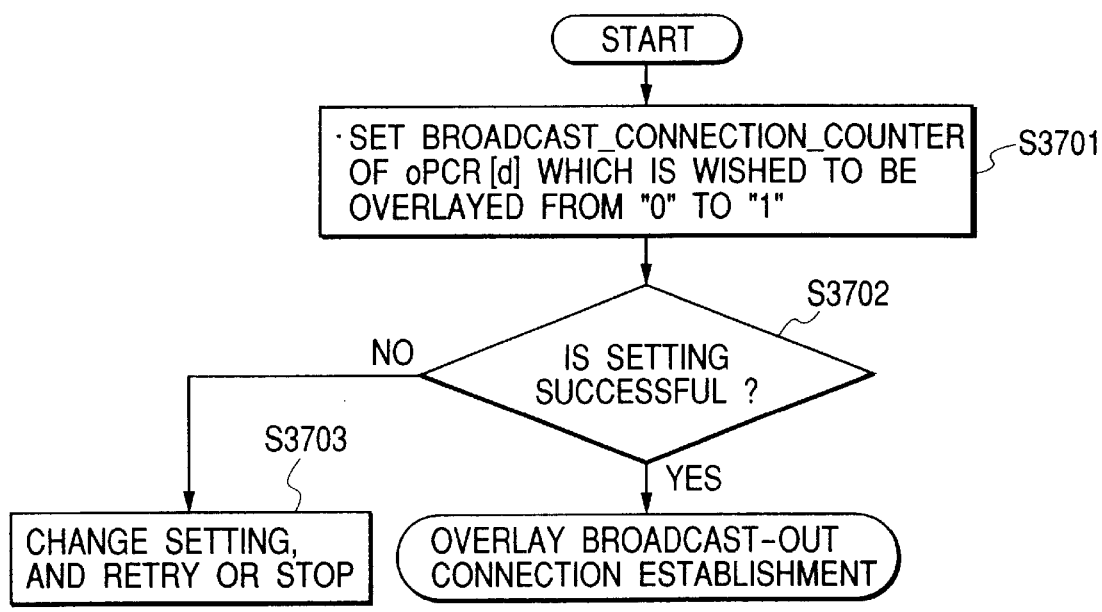
FIG. 41 is a flowchart for explaining an overlay broadcast-out connection in the AV/C isochronous connection protocol.

The following describes the process to set an overlay broadcast-out connection with reference to FIG. 41. The overlay broadcast-out connection is to add a new broadcast-out connection to the output plug to which the connection has already been established. This connection is unprotected and set to an output plug currently in use.

A node (node [D]) to which the overlay broadcast-out connection is to be established changes the broadcast connection counter of the oPCR [d] of the node [D] from "0" to "1" (step S3701).

If writing into the broadcast connection counter is failed (step S3702), a retry is performed after setting values are changed, or the processing is terminated (step S3703).

If writing into the broadcast connection counter is successful (step S3702), the overlay broadcast-out connection is established. This makes it possible for the node [D] to further broadcast isochronous data output through the output plug (oPCR [d]) using the channel number [m].

Figure 42:
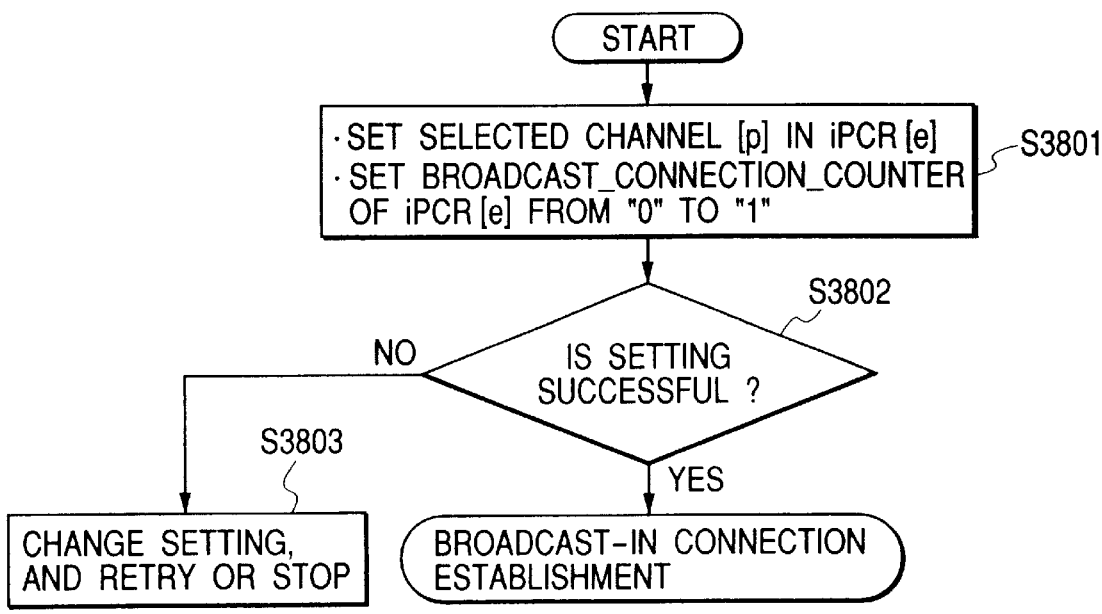
FIG. 42 is a flowchart for explaining a broadcast-in connection in the AV/C isochronous connection protocol.

The following describes the process to set a broadcast-in connection with reference to FIG. 42. The broadcast-in connection is to provide correspondence between an unused isochronous channel and an unused input plug to which no connection is established. This connection is unprotected.

A node (node [E]) to which the broadcast-in connection is to be established selects a desired channel from the isochronous channels currently in use, and performs the lock transaction to write the channel number [p] of the selected channel into an iPCR [e] of the node [E]. Simultaneously, the broadcast connection counter of the iPCR [e] is changed from "0" to "1" (step S3801).

If writing is failed (step S3802), a retry is performed after the plug to be used is changed to another, or the processing is terminated (step S3803).

If writing is successful (step S3802), the broadcast-in connection is established to the iPCR [e] of the node [E]. This makes it possible for the node [E] to input isochronous data of the channel number [p] through the input plug (iPCR [e]).

Figure 43:
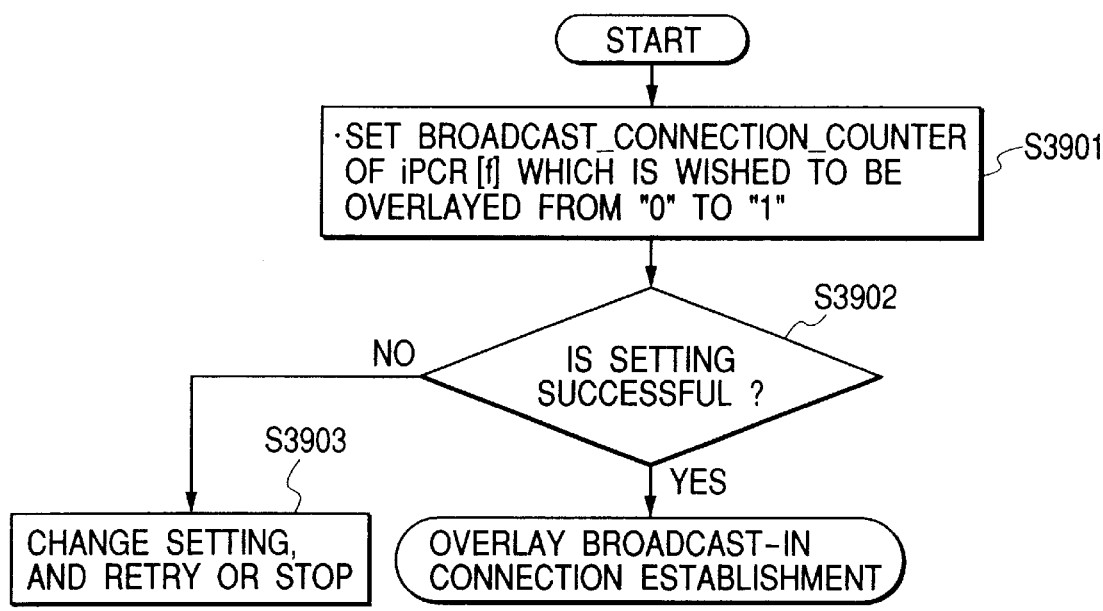
FIG. 43 is a flowchart for explaining an overlay broadcast-in connection in the AV/C isochronous connection protocol.

Finally, the process to set an overlay broadcast-in connection will be described with reference to FIG. 43. The overlay broadcast-in connection is to add a new broadcast-in connection to the input plug to which the connection has already been established. This connection is unprotected and set to an input plug currently in use.

A node (node [F]) to which the overlay broadcast-in connection is to be established changes the broadcast connection counter of the iPCR [f] of the node [F] from "0" to "1" (step S3901).

If writing into the broadcast connection counter is failed (step S3902), a retry is performed after setting values are changed, or the processing is terminated (step S3903).

If writing into the broadcast connection counter is successful (step S3902), the overlay broadcast-in connection is established. This makes it possible for the node [F] to input isochronous data of all channel numbers through the input plug (iPCR [f]).

Figure 44:
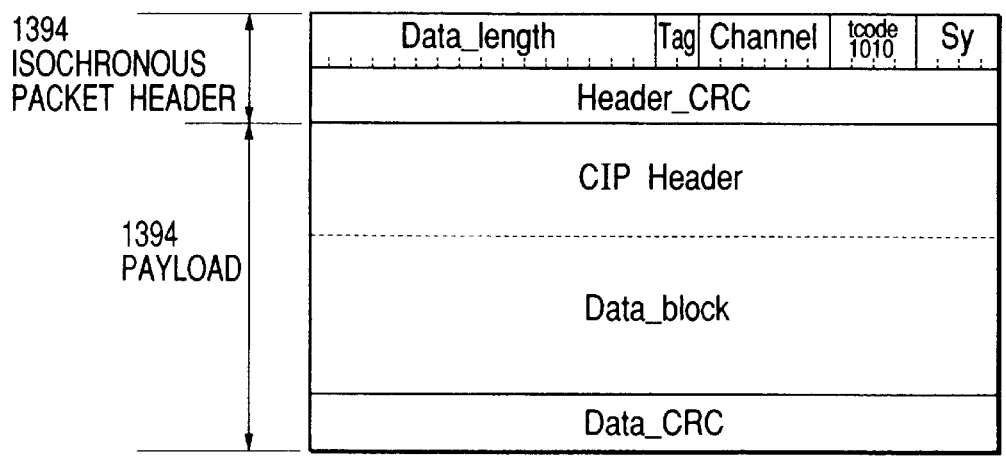
FIG. 44 is an illustration for explaining a CIP packet in the AV/C isochronous connection protocol.

FIG. 44 shows a packet format of isochronous packets to be transferred through the above-mentioned connections.

Stream data coded by a high-efficiency coding scheme such as MPEG2, SD-DVCR, HD-DVCR, SDL-DVCR or MIDI is divided into predetermined data blocks. Each data block is stored in a Data_block part of the isochronous packet shown in FIG. 44, and transferred sequentially in each communication cycle.

The following describes the AV/C asynchronous connection protocol. The AV/C asynchronous connection protocol is one of communication protocols, which uses one or more asynchronous packets to transfer object data securely and efficiently. The object data include static image data, file data, and operation panel information according to the embodiment. Since it uses the asynchronous transfer, not the isochronous transfer, this protocol is reliable and effective in transferring object data for which it is more important to secure the transfer than to transfer in real time. Further, unlike the isochronous transfer, the asynchronous transfer does not always occupy a predetermined bandwidth in each communication cycle, so that high-efficiency transfer can be realized at idle times during a period of asynchronous transfer.

The AV/C asynchronous connection protocol is managed by an upper layer (2110 in FIG. 27) of the transaction layer 2103. Like the AV/C isochronous connection protocol, this protocol uses the concept of plug to manage a logical connection between nodes (hereinbelow, called a "connection") and a flow of transferred stream data (hereinbelow, called "AV/C asynchronous data").

In the AV/C asynchronous connection protocol, the sending side is called a "producer" and the receiving side is called a "consumer". Further, a node having a function for managing and controlling a connection between the producer and the consumer is called a "controller". The AV/C asynchronous connection protocol manages three resources, respectively called producer_count, limit_count and segment_count, to control the data transfer.

FIGS. 45 and 46 show data structures of command and response frames used in the AV/C asynchronous connection protocol.

In FIGS. 45 and 46, "26h" is set in "opcode" parts to indicate that they are an AV/C command set for the AV/C asynchronous connection protocol. The detailed contents of the command and the response are defined by "subfunction" parts. The types and functions of commands are shown in FIG. 47.

In FIG. 47, an ALLOCATE command is a command for allocating a consumer plug resource provided by the consumer to the connection. An ALLOCATE_ATTACH command is a command for allocating a producer plug resource provided by the producer to the connection to connect the same to a consumer plug. An ATTACH command is a command for connecting the consumer plug to the producer plug.

Further, in FIG. 47, a RELEASE command is a command for releasing the consumer plug resource by which the connection is set. A RELEASE_DETACH command is a command for releasing the producer plug resource provided by the producer to disconnect the consumer plug from the producer plug. An ADD_ALLOCATE command is a command for overlay-connecting another producer plug to the consumer plug to which the connection has already been set.

The following describes the process to set the connection with reference to FIG. 48.

In FIG. 48, a controller 4401 sends the ALLOCATE command to a consumer 4402. The consumer 4402 sends a consumer plug address (see FIG. 49) available in the consumer 4402 back to the controller 4401 as a response to the ALLOCATE command (4404 in FIG. 48).

Then, the controller 4401 sends the ALLOCATE_ATTACH command to the producer 4403. At this time, the controller 4401 attaches the consumer plug address to the ALLOCATE_ATTACH command. From the command, the producer 4403 recognizes the consumer plug address of the consumer 4402 to perform initialization for data transmission. The producer 4403 also sends the controller 4401 a response to the command together with a producer plug address (see FIG. 49) of the producer 4403 (4405 in FIG. 48).

Upon receipt of the response from the producer 4403, the controller 4401 sends the ATTACH command to the consumer 4402. At this time, the controller 4401 attaches the producer plug address of the producer 4403 to the ATTACH command. From this command, the consumer 4402 recognizes the producer plug address of the producer 4403 to perform initialization for data transmission (4406 in FIG. 48).

The above-mentioned procedure allows a connection to be set between the consumer plug of the consumer 4402 and the producer plug of the producer 4403. After the completion of setting the connection, three resources, producer_count, limit_count and segment_count, are managed between the consumer 4402 and the producer 4403, and asynchronous data are transferred therebetween.

If a node has both functions as the consumer 4402 and the controller 4401, the node has only to use the ALLOCATE_ATTACH command to set a connection with the producer 4403.

Figure 49:
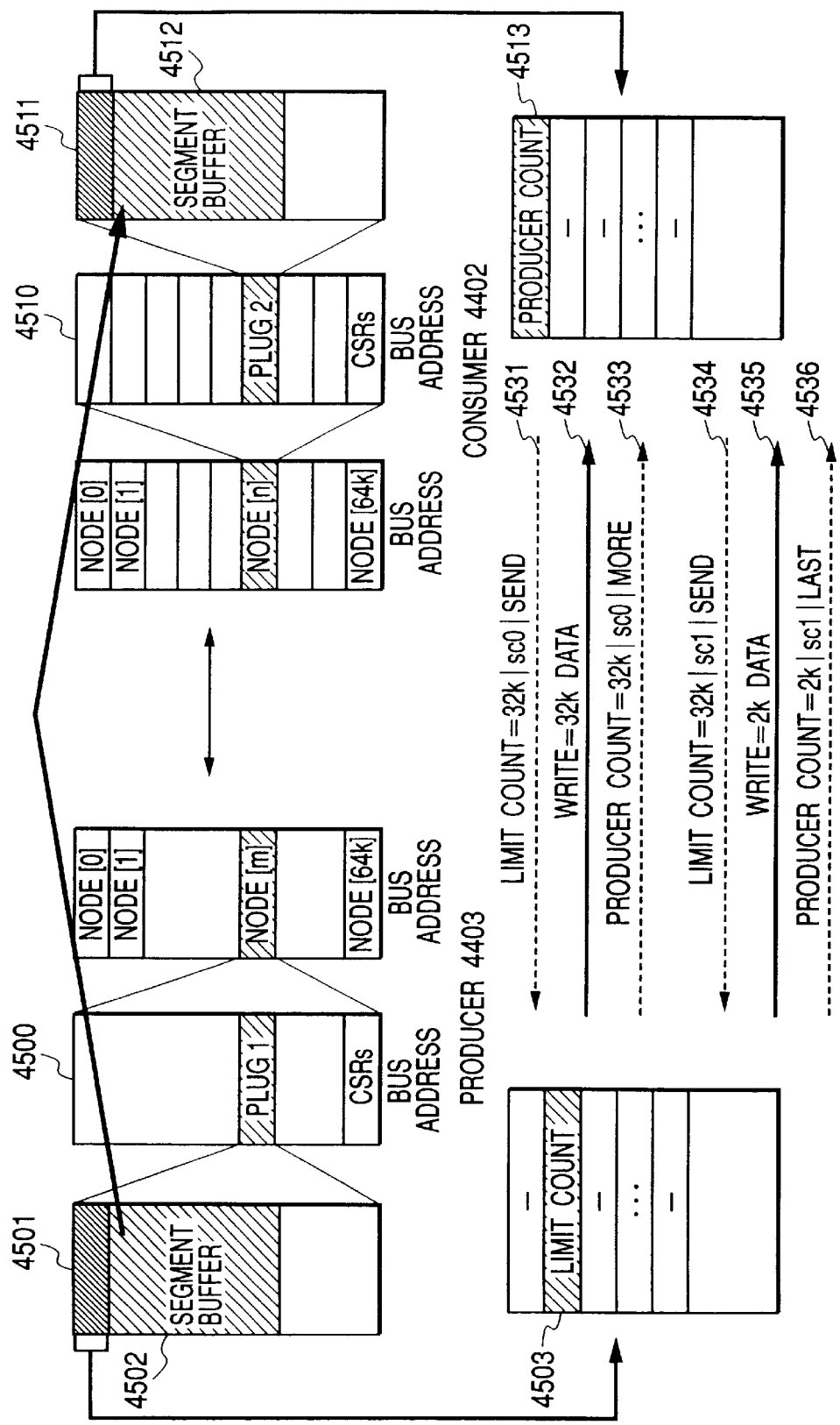
FIG. 49 is a block diagram for explaining a data transfer procedure in the AV/C asynchronous connection protocol.

The following describes the process of the AV/C asynchronous data transfer with reference to FIG. 49.

As shown, a producer plug 4501 of the producer 4403 exists in a predetermined address space provided in CSRs 4500 of the producer 4403. In the producer plug 4501, a register 4503 called "limit_count" is provided. The producer plug 4501 also has a segment_buffer area 4502.

On the other hand, a consumer plug 4511 of the consumer 4402 exists in a predetermined address space provided in CSRs 4510 of the consumer 4402. In the consumer plug 4511, at least one register 4513 called producer_count is provided. The consumer plug 4511 also has a segment_buffer area 4512 into which AV/C asynchronous data are sequentially transferred from the producer 4403 and written.

As an example, the following description is made to a case where 43K bytes of AV/C asynchronous data (one frame) are transferred to the consumer 4402 having a 32K-byte segment_buffer area 4512.

Figure 50:
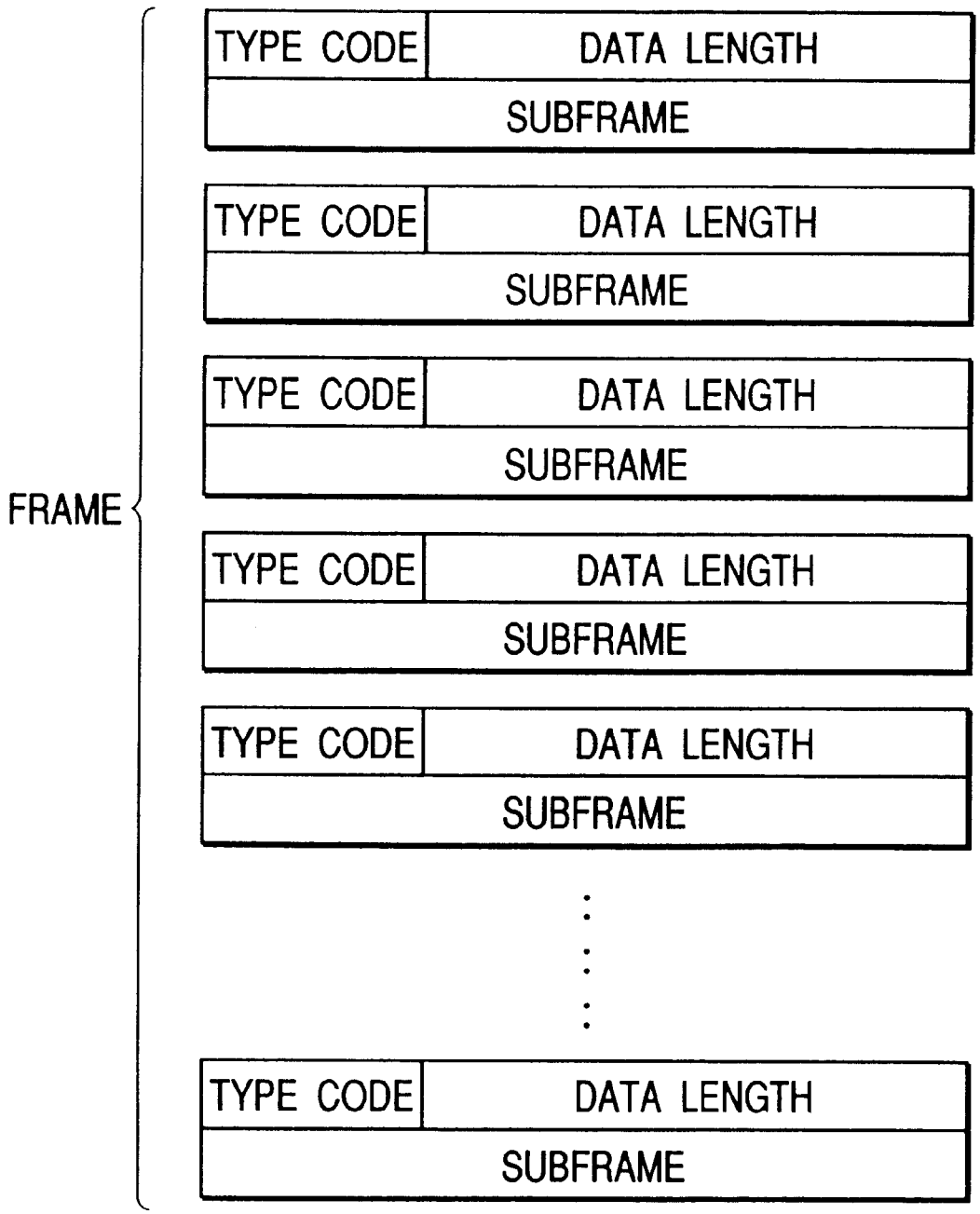
FIG. 50 is an illustration showing an example of a data frame structure in the AV/C asynchronous connection protocol.

FIG. 50 shows a data format of the AV/C asynchronous data. The AV/C asynchronous connection protocol controls the transfer of the AV/C asynchronous data in each "frame" unit. One frame is divided into plural "subframe" if necessary.

The consumer 4402 writes its receivable data size (32K bytes) to the limit_count 4503 of the producer 4403, and changes the current operation mode to "SEND" (=5) (4531 in FIG. 49). The mode "SEND" indicates that the segment_buffer 4512 of the consumer 4402 is available.

When recognizing that the current mode is "send", the producer 4403 starts writing 32K bytes (first subframe) out of 34K bites of data into the segment_buffer 4512 of the consumer 4402 (4532 in FIG. 49).

After the completion of transferring 32K bytes of data, the producer 4403 writes the data size (32K bytes) of transmitted data to the producer_count 4513 of the consumer 4402, and changes the current mode to "MORE" (=1) (4533 in FIG. 49). The mode "MORE" indicates that the transfer of one-frame data has not been completed yet.

When recognizing from the current mode that the data transfer has not been completed yet, the consume 4402 writes again its receivable data size (32K bytes) and the current mode (i.e., "SEND") to the limit count 4503 of the producer 4403 (4534 in FIG. 49). At this time, the consumer 4402 changes the segment_count (sc) from "0" to "1", and informs the producer 4403 that the segment_buffer 4512 is changed.

The producer 4403 starts writing 2K bytes of remaining data (second subframe) into the segment buffer 4512 of the consumer 4402 (4535 in FIG. 49).

After the completion of the data transfer, the producer 4403 writes 2K bytes of transmitted data into the producer_count 4513 of the consumer 4402, and changes the current mode to "LAST" (4536 in FIG. 49). The mode "LAST" indicates that one frame of data has been transferred successfully and that the next transfer data is another frame of data.

In the above-mentioned process, one frame of AV/C asynchronous data is completed.

As described above, according to the embodiment of the present invention, the operation panel of a controlled apparatus (e.g., the tuner 103 or DVCR 104) is displayed on the display screen of a control apparatus (e.g., the display device 101) connected to the same network as the controlled apparatus, thus providing a control system for remotely controlling the displayed operation panel with a remote control for the control apparatus.

Such a configuration lightens the work load of the user, eliminates the need to prepare a different program for each controlled apparatus, and offers the user an optimum operating environment.

Therefore, even if a controlled apparatus having a novel function is connected to the network, the control apparatus can offer the user an operating environment ideal for the controlled apparatus.

Further, since the operation panel consists of image information, an operating environment easy to understand visually can be provided.

Furthermore, plural display levels are settable for each element on the operation panel, and the size of the display panel and the number of elements to be displayed can be changed according to the display level. This makes it possible to secure a sufficient display area for an image to be displayed on the backside of the operation panel such as a television image or reproduced image, and hence to make the most effective use of the display screen.

In the above-mentioned embodiments, in order to secure operativity, the display area of the operation panel is reduced in stepwise fashion in consideration of the frequency of use or the like without reducing the size of the buttons. Therefore, a reduced display of the operation panel can be realized without impairing usability.

Further, in the above-mentioned embodiments, the number of element to be displayed on the operation panel and the display area can be selected automatically at predetermined intervals in consideration of the use of the operation panel by the user. This makes it possible to eliminate the need of user action, and hence to reduce the size of the operation panel without impairing usability.

Furthermore, a request to the controlled apparatus for a change of the operation panel and data retransmission from the controlled apparatus can also be eliminated. This makes it possible to change the operation panel to a different type, created from the display data information initially sent from the controlled apparatus, according to the instructions from the user or the operating state without an unnecessary increase in data transfer amount on the network.

The invention may be embodied in other specific forms without departing from essential characteristics thereof.

For example, although in the above-mentioned embodiments the tuner 103 or DVCR 104 is assumed as an example of the controlled apparatus, the controlled apparatus is not limited thereto. Other electronic equipment such as a printer, an air conditioner or an electric fan is applicable as long as the equipment is compatible with the operation panel structure as practiced in the embodiments and connectable to the network as practiced in the embodiments.

The above-mentioned embodiments are just examples in all respects, and they should not be understood as limitations of the present invention.

The scope of the present invention is defined by the scope of the appended claims, and is not limited at all by the specific descriptions of this specification.

Furthermore, all the modifications and changes belonging to equivalents of the claims are considered to fall within the scope of the present invention.

What is claimed is:

1. A control system, comprising:
   a controlled apparatus that includes an operation panel having display levels; and
   a control apparatus that adapted to receive the operation panel from the controlled apparatus, display the operation panel on a display device, and control the operation panel displayed on the display device using a control signal from an operating device,
   wherein the control apparatus is adapted to inform the controlled apparatus of an operation to the operation panel, and to change a display mode of the operation panel, if a display level of the operation panel is changed.

2. A system according to claim 1, wherein the control apparatus is adapted to change a display area of the operation panel if the display level of the operation panel is changed.

3. A system according to claim 1, wherein the control apparatus is adapted to change a number of elements constituting the operation panel if a display level of the operation panel is changed.

4. A system according to claim 1, wherein the control apparatus is adapted to change a display level of the operation panel after a predetermined time has elapsed.

5. A system according to claim 1, wherein an element constituting the operation panel operates a function provided in the controlled apparatus.

6. A system according to claim 1, wherein a data structure of the operation panel is hierarchical.

7. A system according to claim 1, wherein each of elements constituting the operation panel includes at least one of an image and text.

8. A system according to claim 1, wherein the control apparatus communicates wirelessly with the operating device.

9. A system according to claim 1, wherein control apparatus is adapted to communicate with the controlled apparatus using a digital communication unit that conforms to an IEEE 1394-1995 standard.

10. A control apparatus comprising:
    reception means for receiving an operation panel having display levels from a controlled apparatus; and
    control means for displaying the operation panel on a display device, and for controlling the operation panel displayed on the display device using a control signal from an operating device,
    wherein the control means is adapted to inform the controlled apparatus of an operation to the operation panel, and to change a display mode of the operation panel, if a display level of the operation panel is changed.

11. An apparatus according to claim 10, wherein the control means is adapted to change a display area of the operation panel if a display level of the operation panel is changed.

12. An apparatus according to claim 10, wherein the control means is adapted to change a number of elements constituting the operation panel if a display level of the operation panel is changed.

13. An apparatus according to claim 10, wherein the control means is adapted to change a display level of the operation panel after a predetermined time has elapsed.

14. An apparatus according to claim 10, wherein an element constituting the operation panel operates a function provided in the controlled apparatus.

15. An apparatus according to claim 10, wherein a data structure of the operation panel is hierarchical.

16. An apparatus according to claim 10, wherein each of elements constituting the operation panel includes at least one of an image and text.

17. An apparatus according to claim 10, wherein the control apparatus communicates wirelessly with the operating device.

18. An apparatus according to claim 10, wherein the control apparatus is adapted to communicate with the controlled apparatus using a digital communication unit that conforms to an IEEE 1394-1995 standard.

19. A method for a control apparatus that receives an operation panel having display levels from a controlled apparatus, displays the operation panel on a display device, and controls the operation panel displayed on the display device using a control signal from an operating device, the method comprising the steps of:
    informing the controlled apparatus of an operation to the operation panel; and
    changing a display mode of the operation panel if a display level of the operation panel is changed.

20. A method according to claim 19, further comprising the step of changing a display area of the operation panel if a display level of the operation panel is changed.

21. A method according to claim 19, further comprising the step of changing a number of elements constituting the operation panel if a display level of the operation panel is changed.

22. A method according to claim 19, further comprising the step of changing a display level of the operation panel after a predetermined time has elapsed.

23. A method according to claim 19, wherein an element constituting the operation panel operates a function provided in the controlled apparatus.

24. A method according to claim 19, wherein a data structure of the operation panel is hierarchical.

25. A method according to claim 19, wherein each of elements constituting the operation panel includes at least one of an image and text.

26. A method according to claim 19, wherein the control apparatus communicates wirelessly with the operating device.

27. A method according to claim 19, wherein the control apparatus is adapted to communicate with the controlled apparatus using a digital communication unit that conforms to an IEEE 1394-1995 standard.

* * * * *

UNITED STATES PATENT AND TRADEMARK OFFICE
CERTIFICATE OF CORRECTION

PATENT NO. : 6,684,110 B1
DATED : January 27, 2004
INVENTOR(S) : Masaki Kutsuna et al.

It is certified that error appears in the above-identified patent and that said Letters Patent is hereby corrected as shown below:

Column 5,
Line 39, "steam" should read -- stream --.

Column 22,
Line 34, "A" should read -- An --.

Column 24,
Line 43, "Node" should read -- node --.

Column 25,
Line 3, "(r]" should read -- [r] --.

Column 28,
Line 25, "consume" should read -- consumer --.

Column 29,
Line 50, "adapted" should read -- is adapted --.

Column 30,
Line 15, "control" should read -- the control --.

Signed and Sealed this

Sixth Day of July, 2004

JON W. DUDAS
*Acting Director of the United States Patent and Trademark Office*